US011290803B2

(12) United States Patent
Mizuuchi et al.

(10) Patent No.: US 11,290,803 B2
(45) Date of Patent: Mar. 29, 2022

(54) HEADPHONE, REPRODUCTION CONTROL METHOD, AND PROGRAM

(71) Applicant: SONY CORPORATION, Tokyo (JP)

(72) Inventors: Takayuki Mizuuchi, Chiba (JP); Naoki Watanabe, Saitama (JP); Makoto Yoshimura, Kanagawa (JP); Taeko Usui, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/017,547

(22) Filed: Sep. 10, 2020

(65) Prior Publication Data

US 2020/0413180 A1    Dec. 31, 2020

Related U.S. Application Data

(63) Continuation of application No. 16/746,671, filed on Jan. 17, 2020, now Pat. No. 10,805,712, which is a continuation of application No. 15/781,797, filed as application No. PCT/JP2017/012502 on Mar. 28, 2017, now Pat. No. 10,587,945.

(30) Foreign Application Priority Data

Apr. 11, 2016  (JP) ................................ 2016-079074
Apr. 20, 2016  (JP) ................................ 2016-084388

(51) Int. Cl.
*H04R 1/10*     (2006.01)
*G10K 11/178*   (2006.01)
(Continued)

(52) U.S. Cl.
CPC ........... *H04R 1/1041* (2013.01); *G06F 3/165* (2013.01); *G10K 11/17823* (2018.01);
(Continued)

(58) Field of Classification Search
None
See application file for complete search history.

(56) References Cited

U.S. PATENT DOCUMENTS 9,325,828 B1 *   4/2016  Oh ..................... H04M 1/72454
2011/0096939 A1 *  4/2011  Ichimura ................. G10L 25/84
                                                    381/74
(Continued)

FOREIGN PATENT DOCUMENTS

JP   2006-025402   1/2006
JP   2009-021826   1/2009
(Continued)

OTHER PUBLICATIONS

Official Action (with English translation) for Korean Patent Application No. 10-2018-7015510, dated Dec. 21, 2020.
(Continued)

*Primary Examiner* — Paul W Huber
(74) *Attorney, Agent, or Firm* — Sheridan Ross P.C.

(57) ABSTRACT

The present technology relates to a headphone and a reproduction control method that enable external sound to be caught more easily and promptly, and a program.
The headphone includes: a sound collecting unit configured to collect outer sound; a detection unit configured to detect a specific motion to a sensor unit for capture of the outer sound; and a reproduction control unit configured to cause, in a case where the specific motion is detected, the outer sound collected by the sound collecting unit to be reproduced and volume of audio under reproduction to be reduced or the reproduction of the audio to stop. The present technology can be applied to, for example, a headphone.

18 Claims, 14 Drawing Sheets

(51) Int. Cl.
*G06F 3/16* (2006.01)
*H04R 3/00* (2006.01)

(52) U.S. Cl.
CPC ..... *G10K 11/17837* (2018.01); *H04R 1/1083* (2013.01); *G10K 2210/1081* (2013.01); *G10K 2210/3028* (2013.01); *H04R 1/1008* (2013.01); *H04R 3/00* (2013.01); *H04R 2430/01* (2013.01)

(56) References Cited

U.S. PATENT DOCUMENTS

| | | |
|---|---|---|
| 2014/0126733 A1 | 5/2014 | Gauger |
| 2015/0063586 A1 | 3/2015 | Shah |
| 2015/0222977 A1 | 8/2015 | Angel |

FOREIGN PATENT DOCUMENTS

| | | |
|---|---|---|
| JP | 2009-540654 | 11/2009 |
| JP | 2012-155651 | 8/2012 |
| JP | 2015-173369 | 10/2015 |
| JP | 2015-537466 | 12/2015 |
| KR | 20-2013-0004892 | 8/2013 |
| KR | 102298487 | 9/2021 |
| WO | WO 2010/125797 | 11/2010 |

OTHER PUBLICATIONS

Official Action (with English translation) for Japanese Patent Application No. 2020-042828, dated Dec. 8, 2020, 5 pages.
Official Action (with English translation) for Korea Patent Application No. 10-2021-7027843, dated Dec. 3, 2021, 4 pages.

\* cited by examiner

HEADPHONE, REPRODUCTION CONTROL METHOD, AND PROGRAM

CROSS REFERENCE TO RELATED APPLICATIONS

This application is a continuation of U.S. application Ser. No. 16/746,671, filed 17 Jan. 2020, which is a continuation of U.S. application Ser. No. 15/781,797, filed 6 Jun. 2018, which is a national stage application under 35 U.S.C. 371 and claims the benefit of PCT Application No. PCT/JP2017/012502 having an international filing date of 28 Mar. 2017, which designated the United States, which PCT application claimed the benefit of Japanese Patent Application No. 2016-079074, filed 11 Apr. 2016, and Japanese Patent Application No. 2016-084388, filed 20 Apr. 2016, the entire disclosures of each of which are incorporated herein by reference.

TECHNICAL FIELD

The present technology relates to a headphone, a reproduction control method, and a program, and particularly relates to a headphone and a reproduction control method that enable external sound to be caught more easily and promptly, and a program.

BACKGROUND ART

For example, a noise-cancelling function in a headphone cancels ambient sound, such as noise in a train or an aircraft, leaking in the headphone, to provide a quiet audio-visual environment enabling concentration on music appreciation further.

Meanwhile, because the noise-cancelling function makes the ambient sound difficult to hear, a noise-cancelling headphone has been known for having an external-sound capturing function of capturing external sound from a microphone provided to the outer housing of the headphone, namely, a monitoring function, from the viewpoint of safety or for emergency response (e.g., refer to Patent Document 1). Such noise-cancelling headphones mostly achieve the external-sound capturing function with diversion of a microphone for noise cancelling installed in the external housing.

Such an external-sound capturing function is mostly included in mainly noise-cancelling headphones, and recently Bluetooth (registered trademark) headphones are mostly equipped with the noise-cancelling function. Therefore, the external-sound capturing function is added to many Bluetooth (registered trademark) headphones each attached with the noise-cancelling function.

A typical external-sound capturing function is mostly operated on or off with a dedicated switch (button) implemented in a headphone or a cable of the headphone, or the function may be operated with an operation of an application of a smartphone, for example, in a case where the headphone or the like has no switch.

CITATION LIST

Patent Document

Patent Document 1: Japanese Patent Application Laid-Open No. 2009-21826

SUMMARY OF THE INVENTION

Problems to be Solved by the Invention

However, the technology described above cannot achieve catching of external sound easily and promptly.

Specifically, even if a user desires to listen to external sound quickly for emergency response, it requires much labor to find a small switch or it takes time to boot an application of a smartphone. Thus, in a case where desiring to listen to, for example, an emergency announcement in a train, the user cannot make a quick response.

The present technology has been made in consideration of such situations, and an object of the present technology is to enable external sound to be caught more easily and promptly.

Solutions to Problems

A headphone according to one aspect of the present technology includes: a sound collecting unit configured to collect outer sound; a detection unit configured to detect a specific motion to a sensor unit for capture of the outer sound; and a reproduction control unit configured to cause, in a case where the specific motion is detected, the outer sound collected by the sound collecting unit to be reproduced and volume of audio under reproduction to be reduced or the reproduction of the audio to stop.

The sensor unit can include a touch sensor.

The headphone can be further provided with the sensor unit.

The specific motion can be a motion in which the sensor unit gets covered.

The detection unit can detect a different motion from the specific motion to the sensor unit, and the reproduction control unit can cause, in a case where the detection unit detects the different motion from the specific motion, processing of a different function from a function of reproducing the outer sound, to be performed.

The headphone can be further provided with an operation unit for the capture of the outer sound, and the reproduction control unit can cause, in a case where an operation to the operation unit is made, the outer sound collected by the sound collecting unit to be reproduced with the audio reproduced.

The operation unit can be a switch.

The reproduction control unit can cause, during the detection of the specific motion, the outer sound to be continuously reproduced and the volume of the audio under reproduction to be reduced or the reproduction of the audio to stop.

The reproduction control unit can start, in the case where the specific motion is detected, control of reproducing the outer sound and reducing the volume of the audio under reproduction or stopping the reproduction of the audio.

The headphone can be further provided with a noise-cancelling processing unit configured to achieve a noise-cancelling function on the basis of the outer sound collected by the sound collecting unit.

The reproduction control unit can cause, in the case where the specific motion is detected, the volume of the audio under reproduction to be reduced or the reproduction of the audio to stop and mixed audio of audio for noise cancelling and the outer sound collected by the sound collecting unit to be reproduced, the audio for noise cancelling being generated by the noise-cancelling processing unit on the basis of the outer sound.

The audio for noise cancelling can be audio that cancels a low-frequency component in the outer sound.

A control method or a program according to one aspect of the present technology being a reproduction control method or a program of a headphone including a sound collecting unit configured to collect outer sound, includes the steps of: detecting a specific motion to a sensor unit for capture of the outer sound; and causing, in a case where the specific motion is detected, the outer sound collected by the sound collecting unit to be reproduced and volume of audio under reproduction to be reduced or the reproduction of the audio to stop.

According to one aspect of the present technology, a specific motion to a sensor unit for capture of the outer sound is detected in a headphone including a sound collecting unit configured to collect outer sound. In a case where the specific motion is detected, the outer sound collected by the sound collecting unit is reproduced and volume of audio under reproduction is reduced or the reproduction of the audio stops.

Effects of the Invention

According to one aspect of the present technology, external sound can be caught more easily and promptly.

Note that, the effect described herein is not necessarily limited, and thus any effect described in the present disclosure may be provided.

MODE FOR CARRYING OUT THE INVENTION

Figure 1:
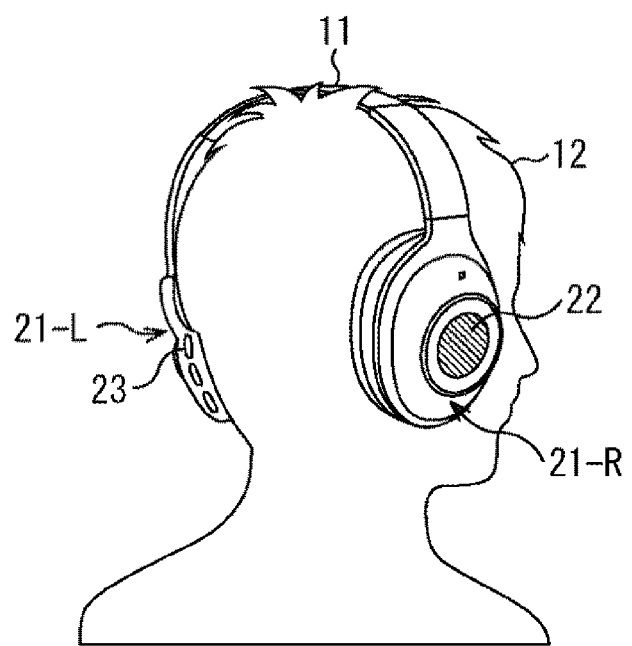
FIG. 1 is a view of an exemplary configuration of a headphone applied with the present technology.

Embodiments applied with the present technology will be described below with reference to the drawings.

First Embodiment

<Exemplary Configuration of Headphone>

The present technology is to provide a new user interface (UI) characterized as being able to efficiently operate a monitoring function (external-sound capturing) with which a noise-cancelling headphone attached with Bluetooth (registered trademark) has been equipped.

That is, the present technology is to achieve monitoring and music stopping with an easy operation of a Bluetooth (registered trademark) operation touch sensor or is to achieve monitoring and music reproduction with an operation of a dedicated switch, in a case where it is desirable to listen to ambient sound urgently.

A headphone applied with the present technology has mainly any of the following features (1) to (4).

Feature (1)

There is provided a monitoring mode in which covering the touch sensor allows music to stop.

Feature (2)

There is provided a monitoring mode in which an operation of the switch allows the music to be listened to.

Feature (3)

There are provided both of feature (1) and feature (2).

Feature (4)

The touch sensor also serves as reproduction/stop, for example.

More specifically, the headphone applied with the present technology has an external-sound capturing function of capturing outer sound with a microphone installed in an external housing unit of the headphone and reproducing the outer sound in the headphone to enable the outer sound to be listened to with the headphone remaining worn, namely, a monitoring function implemented. The headphone is characterized as controlling the external-sound capturing function with an operation of the touch sensor installed in the external housing unit of the headphone.

In addition, the headphone can adopt a scheme in which the touch sensor includes a plurality of elements.

Furthermore, the headphone enables the external-sound capturing function to start up when not less than an arbitrarily set number of elements of the touch sensor are simultaneously touched with a hand, and enables the external-sound capturing function to be released when the hand is removed.

In addition, the headphone enables the music under reproduction or the like to pause or the volume to be reduced during the operation of the external-sound capturing function, in order to make the external sound easy to listen to.

The headphone enables the touch sensor to also serve as a Bluetooth (registered trademark) operation sensor.

In addition, the headphone can include an external-sound capturing function switch separately from the touch sensor, and enables the external-sound capturing function on or off with the external-sound capturing function switch.

Furthermore, the headphone enables the music to remain reproduced even when the external-sound capturing function is on, so that the outer sound can be listened to with the music remaining listened to.

The headphone can be equipped with a noise-cancelling function.

The headphone applied with the present technology will be described below with reference to FIGS. 1 to 3. Note that, in FIGS. 1 to 3, mutually corresponding parts are denoted with the same reference signs, and thus the descriptions thereof will be appropriately omitted.

FIG. 1 is a view of an exemplary configuration of one embodiment of the headphone applied with the present technology.

A headphone 11 illustrated in FIG. 1 is worn on the head of a user 12, and reproduces the sound of content, such as music. In addition, the headphone 11 has the external-sound capturing function of capturing and reproducing external sound, namely, the monitoring function.

The headphone 11 includes a housing unit 21-R to be worn on a right ear portion of the user 12 and a housing unit 21-L to be worn on a left ear portion of the user 12.

Note that, in a case where there is no need to distinguish the housing unit 21-R and the housing unit 21-L particularly, hereinafter, they are simply referred to as a housing unit 21.

In addition, a touch sensor 22 is provided on a face provided on the opposite side to the user 12 side of the housing unit 21-R being an external housing portion of the headphone 11, namely, on a housing face facing outward. Furthermore, a monitoring switch 23 is provided to the housing unit 21-L being an external housing portion of the headphone 11.

The touch sensor 22 is typically used for Bluetooth (registered trademark) operations (e.g., reproduction, stop, volume control, and fast forward). That is, the user 12 operates the touch sensor 22 to enable the headphone 11 to perform processing relating to reproduction of audio of content, for example, reproduction of the sound of content, such as music, stop of the reproduction, volume control of the sound of the content to be reproduced, and fast forward of a piece of music to be reproduced.

Figure 2:
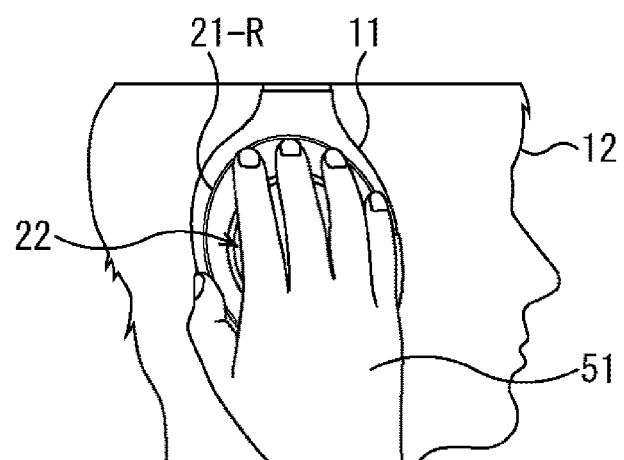
FIG. 2 is a view for describing the start-up of an external-sound capturing function.

In addition, for example, as illustrated in FIG. 2, the user 12 covers the touch sensor 22 with a user's hand 51 to enable ambient sound to be captured and the music to stop (or the volume to be reduced) immediately. This arrangement enables the user 12 to respond to a sudden announcement or conversation with the headphone 11 remaining worn.

That is, with the touch sensor 22 covered with, for example, the hand 51 of the user 12, the headphone 11 collects the external sound with a microphone not illustrated, to reproduce the external sound collected and to reduce the volume of the sound of the content reproduced until now or to cause the reproduction of the sound of the content to stop or pause.

Figure 3:
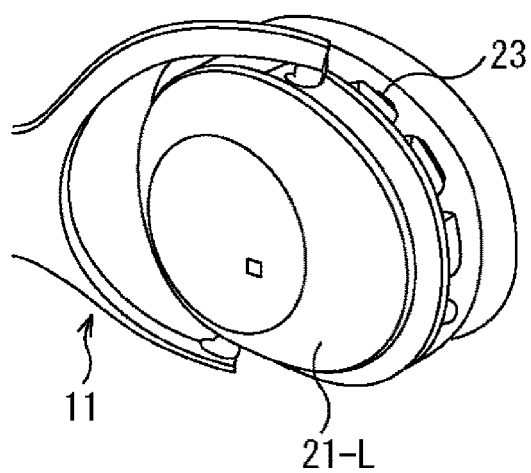
FIG. 3 is a view for describing a monitoring switch.

Meanwhile, the headphone 11 is provided with, for example, some switches as illustrated in FIG. 3. In the example illustrated in FIG. 3, the monitoring switch 23 is one of the plurality of switches provided to the housing unit 21-L of the headphone 11.

In this manner, the headphone 11 is equipped with the monitoring switch 23 dedicated for the monitoring function, namely, for the external-sound capturing function, separately from the touch sensor 22, and the user 12 operates the monitoring switch 23 to enable a transition to a mode of capturing the ambient sound with the music remaining listened to. That is, when the monitoring switch 23 is operated while the sound of the content is being reproduced, the headphone 11 collects the external sound with the microphone not illustrated and reproduces the external sound collected, keeping the sound of the content reproduced.

Furthermore, as a different embodiment of the headphone applied with the present technology, it can be considered that a headphone dedicated for noise cancelling having no Bluetooth (registered trademark) operation function, is equipped with a touch sensor in order to have a similar function to that of the headphone 11.

The headphone applied with the present technology described above, is characterized as being able to start up the external-sound capturing function, with diversion of the multi-element-type touch sensor mounted for Bluetooth (registered trademark) operations, such as volume control and fast forward, by a touch such that a sensor unit is covered with one hand.

The Bluetooth (registered trademark) operation touch sensor is often mounted on a housing face on one side of a headphone. Instantaneously covering the housing face with one hand is a very easy and intuitive motion for the user, and thus there is no need of much labor and time as in a case where the position of a small switch is felt by a fingertip and additionally no dedicated switch is required.

In addition, recent external-sound capturing functions are mostly characterized as allowing external sound to be listened to with music under reproduction. In contrast to this, in order to prioritize listening to the external sound urgently, the headphone applied with the present technology is characterized as reducing the volume of the music reproduced or causing the reproduction of the music to pause during capture of the external sound when the external-sound capturing function starts up with an action of covering, with a hand, the touch sensor provided on the housing face.

This arrangement enables the external-sound capturing function to start up promptly with an easy motion and the external sound to be easily listened to with the volume of the music reproduced reduced, so that a response can be made without missing, for example, an emergency announcement. Such a function may function only while the user is covering the touch sensor or the function may be repeatedly operated on and off by touching the touch sensor as a trigger.

In addition, in order to enable the external-sound capturing function to be used in combination with a typical one so far, a dedicated switch may be provided separately from the touch sensor so that the switch enables the external-sound capturing function to be operated with music under reproduction.

Note that, a headphone dedicated for noise cancelling having no Bluetooth (registered trademark) operation, is equipped with a similar touch sensor, so that a similar function can be added.

In addition, the touch sensor that causes the external-sound capturing function to start up can be an electrostatic-capacitance-type matrix sensor. Furthermore, a touch panel having a display function can be used as the touch sensor. Furthermore, the headphone may achieve an external-sound capturing function that enables the outer sound to be listened to, performing noise cancelling to noise in a specific band.

In the present technology described above, the external-sound capturing function can start up promptly with an easy operation with the touch sensor and furthermore the external sound is easy to catch because of the volume of the music reproduced reduced, so that a response can be made without missing, for example, an emergency announcement. That is the external sound can be caught more easily and promptly.

In addition, in order to enable the external-sound capturing function to be used in combination with a typical spec one, the dedicated switch is provided separately from the touch sensor to enable the external-sound capturing function to be operated with the music under reproduction, so that the external-sound capturing function can be used for emergency response.

<Exemplary Functional Configuration of Headphone>

Next, an exemplary functional configuration of the headphone described above will be described.

Figure 4:
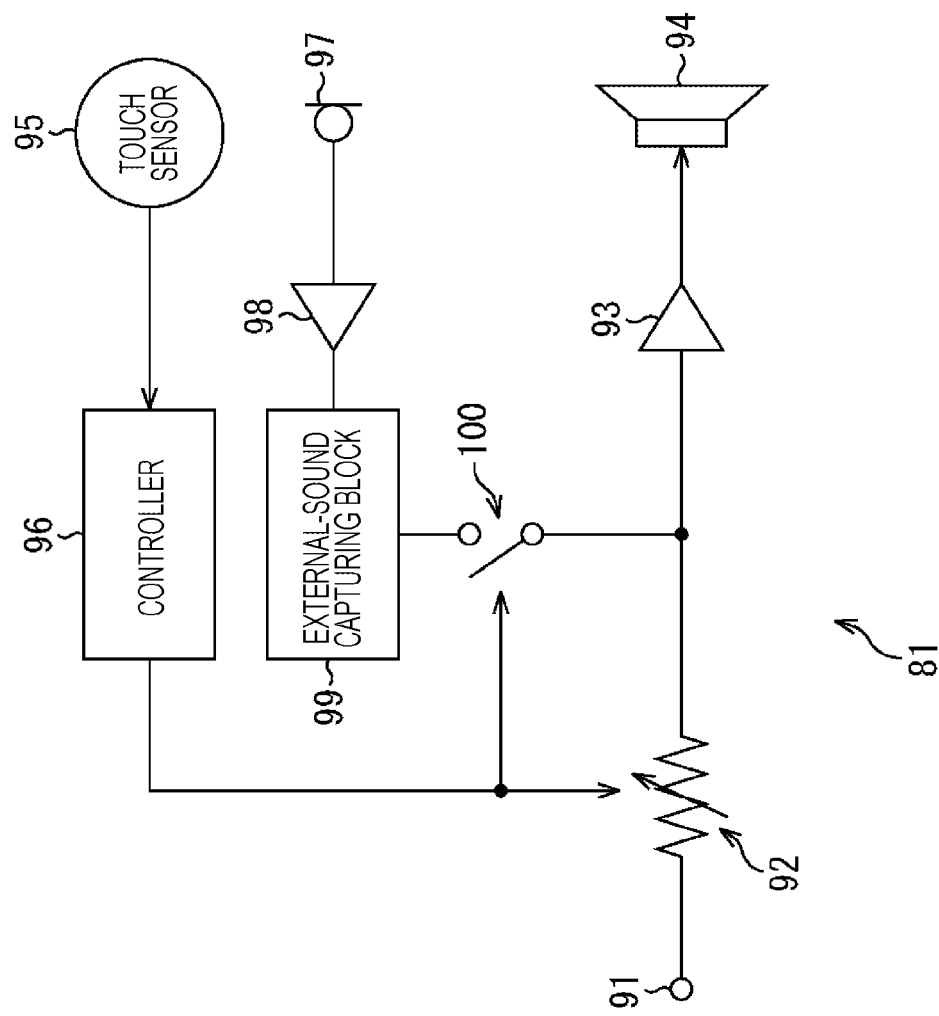
FIG. 4 is a diagram of an exemplary functional configuration of a headphone applied with the present technology.

FIG. 4 is a diagram of an exemplary functional configuration of a headphone applied with the present technology.

The headphone 81 illustrated in FIG. 4 includes an input unit 91, an attenuator 92, an amplifier 93, a speaker 94, a touch sensor 95, a controller 96, a microphone 97, an amplifier 98, an external-sound capturing block 99, and a switch 100.

The configuration of the external appearance of the headphone 81 is similar to, for example, that of the headphone 11 illustrated in FIG. 1, but is provided with no monitoring switch. In addition, in more detail, the headphone 81 is provided with the attenuator 92, the amplifier 93, the speaker 94, the microphone 97, the amplifier 98, the external-sound capturing block 99, and the switch 100, for each channel for audio to be reproduced, namely, for each of the left and right channels.

The input unit 91 is connected with an audio reproducing device not illustrated, such as a smartphone or a portable player, by wire through, for example, a cable or the like, and supplies an audio signal of the audio of content supplied from the audio reproducing device, to the speaker 94 through the attenuator 92 and the amplifier 93.

The attenuator 92 attenuates the amplitude of the audio signal supplied from the input unit 91 in accordance with the control of the controller 96 to control the volume of the audio based on the audio signal, and then supplies the audio signal having the volume controlled to the amplifier 93. The amplifier 93 amplifies the audio signal supplied from the attenuator 92, to supply the audio signal to the speaker 94.

The speaker 94 is, for example, an audio output unit that is a so-called headphone driver, arranged on the user's ear side of a housing unit of the headphone 81, and reproduces the audio on the basis of the audio signal supplied from the amplifier 93.

The touch sensor 95 includes, for example, an X-Y-coordinates-detection-type electrostatic sensor or an electrostatic-button-detection-type electrostatic sensor, and outputs a signal corresponding to a motion of the user to the touch sensor 95, to the controller 96. The touch sensor 95 corresponds to the touch sensor 22 illustrated in FIG. 1, and is provided on a housing face facing outward, of the housing unit on one side of the headphone 81, for example, on the right side.

Here, the motion to be made by the user to the touch sensor 95 is specific for performance of the external-sound capturing function (monitoring function) of causing the speaker 94 to reproduce the external sound captured with the microphone 97, namely, the outer sound being the outer audio around the headphone 81.

Specifically, the specific motion (gesture) mentioned here is a motion in which the user covers the entire touch sensor 95 with a hand. However, the specific motion for performance of the external-sound capturing function may be any motion as long as the specific motion is to be intuitively made by the user when desiring to listen to the external sound.

For example, a motion in which the user holds a hand over the housing face of the housing unit or a side face of the housing unit or a motion in which the user holds the housing unit with some fingers, may be adopted as the motion for performance of the external-sound capturing function. In that case, a sensor, such as the touch sensor 95, may be provided at an appropriate position of the housing unit so that such a motion can be detected. Note that, the sensor that detects the motion of the user is not limited to the touch sensor, and thus may be any different sensor, such as a 3D sensor.

The controller 96 controls the operation of the entire headphone 81. For example, the controller 96 functions as a reproduction control unit that controls the attenuator 92 and the switch 100 in response to an output of the touch sensor 95 to control reproduction of the audio of the content or the external sound in the headphone 81.

The microphone 97 is a sound collecting unit that collects the ambient sound of the headphone 81, namely, the external sound (outer sound), and supplies an external-sound signal acquired by the collection to the amplifier 98. The amplifier 98 amplifies the external-sound signal supplied from the microphone 97 to supply the external-sound signal to the external-sound capturing block 99.

The external-sound capturing block 99 captures the external-sound signal from the microphone 97 through the amplifier 98 and additionally performs, for example, filtering processing to the external-sound signal captured as necessary, to supply the external-sound signal to the speaker 94 through the switch 100 and the amplifier 93. Here, the filtering processing to be performed to the external-sound signal by the external-sound capturing block 99, includes, for example, correcting the frequency characteristic of the external sound by emphasizing the frequency band of human voice or cutting (removing) a frequency band excluding the frequency band of human voice.

The switch 100 turns on or off in accordance with the control of the controller 96. That is, the external-sound capturing block 99 and the amplifier 93 are electrically connected with each other when the switch 100 turns on, and the external-sound capturing block 99 and the amplifier 93 are electrically disconnected from each other when the switch 100 turns off.

<Exemplary Configuration of Touch Sensor>

Figure 5:
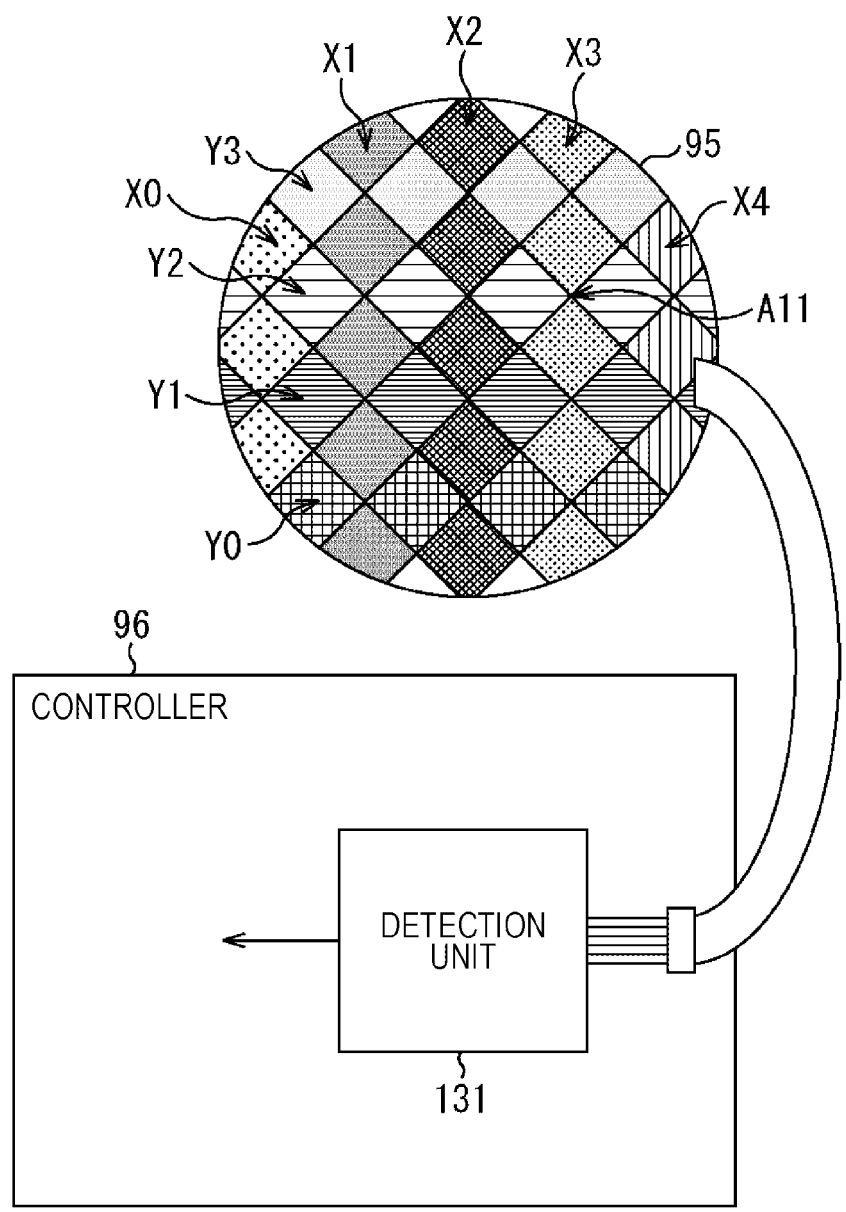
FIG. 5 is a diagram of an exemplary configuration of a touch sensor.

In addition, the touch sensor 95 illustrated in FIG. 4 has, for example, a configuration illustrated in FIG. 5. Note that, parts in FIG. 5 corresponding to those in FIG. 4 are denoted with the same reference signs and the descriptions thereof will be appropriately omitted.

In FIG. 5, the touch sensor 95 including a plurality of elements arranged is connected with a detection unit 131 provided in the controller 96 through a flexible flat cable. The detection unit 131 provided in the controller 96 controls the touch sensor 95 and additionally detects the motion of the user to the touch sensor 95 on the basis of the output from the touch sensor 95.

Here, the vertical direction in the figure is defined as a y direction, and the horizontal direction in the figure is defined as an x direction. In the example, the touch sensor 95 detects a touch or approach of the user to the touch sensor 95 in the X-Y coordinates detection manner.

Specifically, one square represents one element and the elements each include an electrostatic sensor, such as a capacitor, in FIG. 5, for example.

The touch sensor 95 is provided with five element lines X0 to X4 arranged in the x direction and four element lines Y0 to Y3 arranged in the y direction. The element lines X0 to X4 each include a plurality of elements arranged in the y direction, and the element lines Y0 to Y3 each include a plurality of elements arranged in the x direction.

Note that, in a case where there is no need to distinguish the element lines X0 to X4 particularly, hereinafter, they are simply referred to as an element line X, and in a case where there is no need to distinguish the element lines Y0 to Y3 particularly, hereinafter, they are simply referred to as an element line Y.

The touch sensor 95 supplies a detected signal corresponding to the touch or approach of the user to the elements included in the touch sensor 95, from each of the element lines X and the element lines Y to the detection unit 131.

For example, it is assumed that the user has touched a position indicated with an arrow A11 with a finger. In this case, the electrostatic capacitance of an element in proximity to the position indicated with the arrow A11, increases and thus the detected signal output from the element line provided with the element, is large by the increase in the electrostatic capacitance of the element.

Therefore, in the case where the user has touched the position indicated with the arrow A11 with the finger, the detected signal of the element line X3 and the detected signal of the element line Y2 are particularly large, the element line X3 and the element line Y2 each having elements in proximity to the position.

The detection unit 131 detects the increase in the detected signal of each of the element line X3 and the element line Y2, so that it can be determined what position (point) of the touch sensor 95 the user has made an operation to, namely, what position the user has touched. That is, the operated position of the user in the x direction can be specified from the detected signal of the element line X3, and the operated position of the user in the y direction can be specified from the detected signal of the element line Y2. Furthermore, the operated position of the user on an x-y plane can be specified from a specified result of the operated positions in the x direction and the y direction.

For example, the detection unit 131 compares the detected signal from an element line to a previously determined threshold value th. In a case where the detected signal is the threshold value th or more, the detection unit 131 determines that the user has touched or approached an element in the element line, namely, the user has made an operation.

When the user acts to cover the touch sensor 95, the detected signals from at least three element lines at a time, are the threshold value th or more. In that case, the detection unit 131 determines that the user has covered the touch sensor 95. That is, it is determined that the specific motion for performance of the external-sound capturing function (monitoring function) has been made.

As described above, the detection unit 131 can detect a face touch operation (multi-point touch operation) of the user to the touch sensor 95.

Note that, the detection of the motion in which the user covers the touch sensor 95, is not limited to whether the detected signals from the at least three element lines are the threshold value th or more at a time, and thus may be performed by any different method. For example, in a case where the detected signals of not less than eight element lines are the threshold value th or more from the total nine element lines, it may be determined that the user has acted to cover the touch sensor 95.

Note that, the detection unit 131 can detect various operations (gestures) of the user to the touch sensor 95, such as a tap motion (tap operation) and a swipe motion (swipe operation), on the basis of a detected signal at a plurality of sequential times, namely, the variation of the detected signal in a time direction. For example, the detection unit 131 can recognize that the user has made the swipe motion, in a case where the touched position of the user on the touch sensor 95 moves in a predetermined direction with time.

Figure 6:
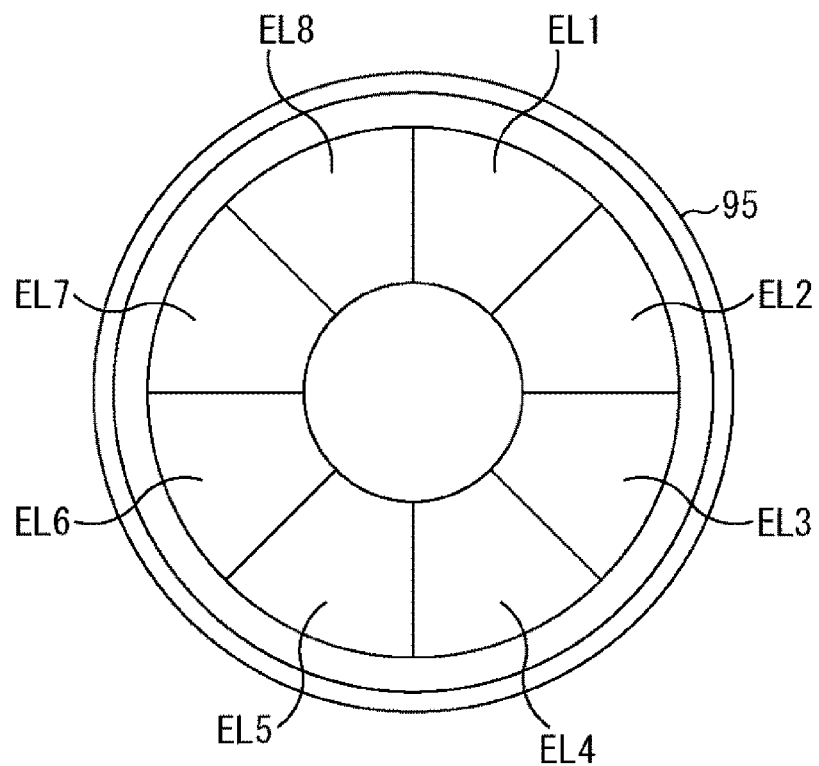
FIG. 6 is a diagram of a different exemplary configuration of the touch sensor.

In addition, the touch sensor 95 is not limited to the example illustrated in FIG. 5, and thus may have, for example, a configuration illustrated in FIG. 6.

In the example illustrated in FIG. 6, the touch sensor 95 includes eight elements EL1 to EL8. Here, the eight elements EL1 to EL8 each including a button-type electrostatic sensor, are arranged annularly, and ground regions are provided inside and outside the elements. Note that, in a case where there is no need to distinguish the elements EL1 to EL8 particularly, hereinafter, they are simply referred to as an element EL.

The detection unit 131 of the controller 96 is to be provided with a detected signal from each element EL. The detection unit 131 compares the detected signal provided from an element EL to the threshold value th described above, so that the detection unit 131 can detect a touch or approach of the user to the element EL.

Therefore, in the example, in a case where not less than a predetermined number of detected signals from the detected signals of the eight elements EL, for example, all the eight detected signals are the threshold value th or more, it can be determined that the user has acted to cover the touch sensor 95.

In addition, the touch sensor 95 illustrated in FIG. 6 can detect the tap motion or the swipe motion, similarly to the example illustrated in FIG. 5. For example, in a case where an operation to only the element EL7 is detected immediately after detection of an operation to only the element EL2, it is determined that the user has made the swipe motion in the left direction. In addition, for example, in a case where an operation to only the element EL4 is detected immediately after detection of an operation to only the element EL1, it is determined that the user has made the swipe motion in the downward direction.

Note that, the example illustrated in FIG. 5 and the example illustrated in FIG. 6 have been described as the exemplary configuration of the touch sensor 95, but the touch sensor 95 may have any configuration as long as the touch sensor 95 can detect at least the specific motion of the user for performance of the external-sound capturing function (monitoring function). In addition, the following description will be given with the touch sensor 95 having the configuration illustrated in FIG. 5.

<Description of External-Sound Capturing Processing>

Next, the operation of the headphone 81 illustrated in FIG. 4 will be specifically described. That is, external-sound capturing processing of the headphone 81 will be described below with reference to a flowchart of FIG. 7. Note that, here, it is assumed that the audio reproducing device has been supplying the headphone 81 with the audio signal of the audio of the content, namely, the audio of the content is being reproduced.

At step S11, the detection unit 131 of the controller 96 determines whether the user has acted to cover the touch sensor 95, on the basis of a detected signal supplied from the touch sensor 95.

For example, in a case where the detected signals from not less than a predetermined number of element lines previously determined are the threshold value th or more, the detection unit 131 determines that the motion in which the touch sensor 95 gets covered has been made, namely, the motion for performance of the external-sound capturing function has been made.

In a case where it is determined at step S11 that the motion in which the touch sensor 95 gets covered, has not been made, namely, an indication for performance of the external-sound capturing function has not been given, the processing proceeds to step S12.

At step S12, the controller 96 causes the audio of the content to be reproduced, and the external-sound capturing processing finishes. That is, the controller 96 renders the switch 100 off.

In this case, the audio signal of the audio of the content supplied from the audio reproducing device to the input unit 91, is supplied to the speaker 94 through the attenuator 92 and the amplifier 93. The speaker 94 reproduces the audio of the content, on the basis of the audio signal supplied in this manner. That is, the audio of the content is continuously reproduced.

In contrast to this, in a case where it is determined at step S11 that the motion in which the touch sensor 95 gets covered has been made, the processing proceeds to step S13.

At step S13, the controller 96 controls the attenuator 92 to reduce the volume of the audio of the content.

The attenuator 92 attenuates the amplitude of the audio signal supplied from the input unit 91 in accordance with the control of the controller 96, to reduce the volume of the audio of the content based on the audio signal, and supplies the audio signal acquired resultantly to the speaker 94 through the amplifier 93. Note that, the audio of the content may be muted during the volume control.

The speaker 94 reproduces the audio of the content, on the basis of the audio signal supplied from the attenuator 92 through the amplifier 93. This arrangement allows the user to catch the external sound easily with the volume of the audio of the content reduced or muted.

At step S14, the external-sound capturing block 99 captures the external sound around the headphone 81. That is, the headphone 81 has the microphone 97 constantly collecting the external sound. After acquiring the external-sound signal from the microphone 97 through the amplifier 98, the external-sound capturing block 99 performs processing such as frequency characteristic correction, to the external-sound signal as necessary and additionally outputs the external-sound signal subjected to the processing as necessary.

At step S15, the controller 96 turns the switch 100 on and renders the external-sound capturing block 99 electrically connected with the amplifier 93, to cause the external sound captured to be reproduced.

When the control of the controller 96 turns the switch 100 on, the external-sound signal output from the external-sound capturing block 99 is supplied to the speaker 94 through the switch 100 and the amplifier 93. The speaker 94 reproduces the external sound on the basis of the external-sound signal supplied from the external-sound capturing block 99 in this manner.

At this time, because the volume of the audio of the content has been reduced or muted resulting from the volume reduced, the user can clearly catch the external sound reproduced. When the speaker 94 reproduces the external sound, the external-sound capturing function finishes.

As described above, the headphone 81 detects the motion in which the user covers the touch sensor 95. In response to the detected result thereof, the headphone 81 performs volume control to the audio of the content, and additionally reproduces the external sound.

In this manner, the detection of the motion, such as the covering of the touch sensor 95 by the user, made instantaneously or intuitively when the user desires to listen to the external sound and the reproduction of the external sound enable the user to catch the external sound more easily and promptly. That is, the usability of the headphone 81 can improve.

Furthermore, during the reproduction of the external sound, reducing the volume of the audio of the content reproduced until now or muting the audio of the content enables the external sound to be caught more clearly.

Note that, the headphone 81 starts the performance of the external-sound capturing function, namely, the processing of reproducing the external sound with the detection of the motion in which the touch sensor 95 gets covered as a trigger, but the timing of the finish of the processing of reproducing the external sound may be any timing. In this respect, embodiments to be described later are similar to the embodiment.

For example, after starting the processing of reproducing the external sound, the controller 96 enables the external sound to be continuously reproduced while the detection unit 131 is continuously detecting the motion in which the touch sensor 95 gets covered. At this time, the volume of the audio of the content remains reduced.

In this case, the reproduction of the external sound starts when the user converse the touch sensor 95, and the reproduction of the external sound finishes when the user stops covering the touch sensor 95 after that, namely, the hand is removed from the touch sensor 95.

Note that, in the example, while listening to the external sound, the user needs to cover the touch sensor 95 continuously with the hand, but the hand of the user may gradually deviate from the touch sensor 95 while the user is listening to the external sound.

Thus, after the reproduction of the external sound starts once, for example, the threshold value th used in the detection unit 131 may be changed to a value slightly smaller than that in the normal state or the number of detected signals each having the threshold value th or more, required in order to determine that the touch sensor 95 has been covered, may be made less than that in the normal state so that the motion in which the user covers the touch sensor 95 is easy to detect. This arrangement enables the reproduction of the external sound to start and stop more appropriately.

In addition, for example, in a case where the motion in which the touch sensor 95 gets covered is detected, the controller 96 starts the processing (control) of reproducing the external sound. After that, the controller 96 enables the reproduction of the external sound to stop when a specific operation is made. In the example, during the reproduction of the external sound, the volume of the audio of the content remains reduced.

In this case, for example, when the motion in which the user covers the touch sensor 95 with the hand is detected again after the reproduction of the external sound starts, the controller 96 causes the reproduction of the external sound to stop. Therefore, in this case, after the user covers the touch sensor 95 with the hand to start the reproduction of the external sound, even when the user removes the hand from the touch sensor 95, the reproduction of the external sound is continuously performed. Then, when the user covers the touch sensor 95 with the hand again, the reproduction of the external sound stops.

Note that, a motion to the touch sensor 95 for the stop of the reproduction of the external sound, is not limited to the motion in which the user covers the touch sensor 95 with the hand, and thus may be any different motion. In addition, the embodiment is not limited to the operation to the touch sensor 95. The reproduction of the external sound may stop when an operation is made to an operation unit, such as a different button or switch, provided to the headphone 81.

Furthermore, the example in which a device to be equipped with the external-sound capturing function is a headphone, has been described above, but the present technology can be applied to others, such as an earphone and a head-mounted display.

For example, for application of the present technology to the earphone, when a user wearing the earphone on the ears acts to cover an earphone portion, namely, an ear portion, detection of the motion by the earphone enables capture and reproduction of external sound to be performed and additionally enables volume control of audio reproduced until now or stop of the reproduction to be performed. In addition, when the user holds, for example, an operation unit provided to a cable of the earphone, namely, a controller portion, the capture and reproduction of the external sound may be performed and additionally the volume control of the audio reproduced until now or the stop of the reproduction may be performed.

Second Embodiment

<Exemplary Functional Configuration of Headphone>

In addition, the headphone 81 is connected with the audio reproducing device with the cable in the example illustrated in FIG. 4, but the headphone 81 and the audio reproducing device may be mutually connected wirelessly. That is, the headphone 81 may be a so-called Bluetooth (registered trademark) headphone. In that case, the headphone 81 has, for example, a configuration illustrated in FIG. 8. Note that, parts in FIG. 8 corresponding to those in FIG. 4 are denoted with the same reference signs and the descriptions thereof will be appropriately omitted.

Figure 8:
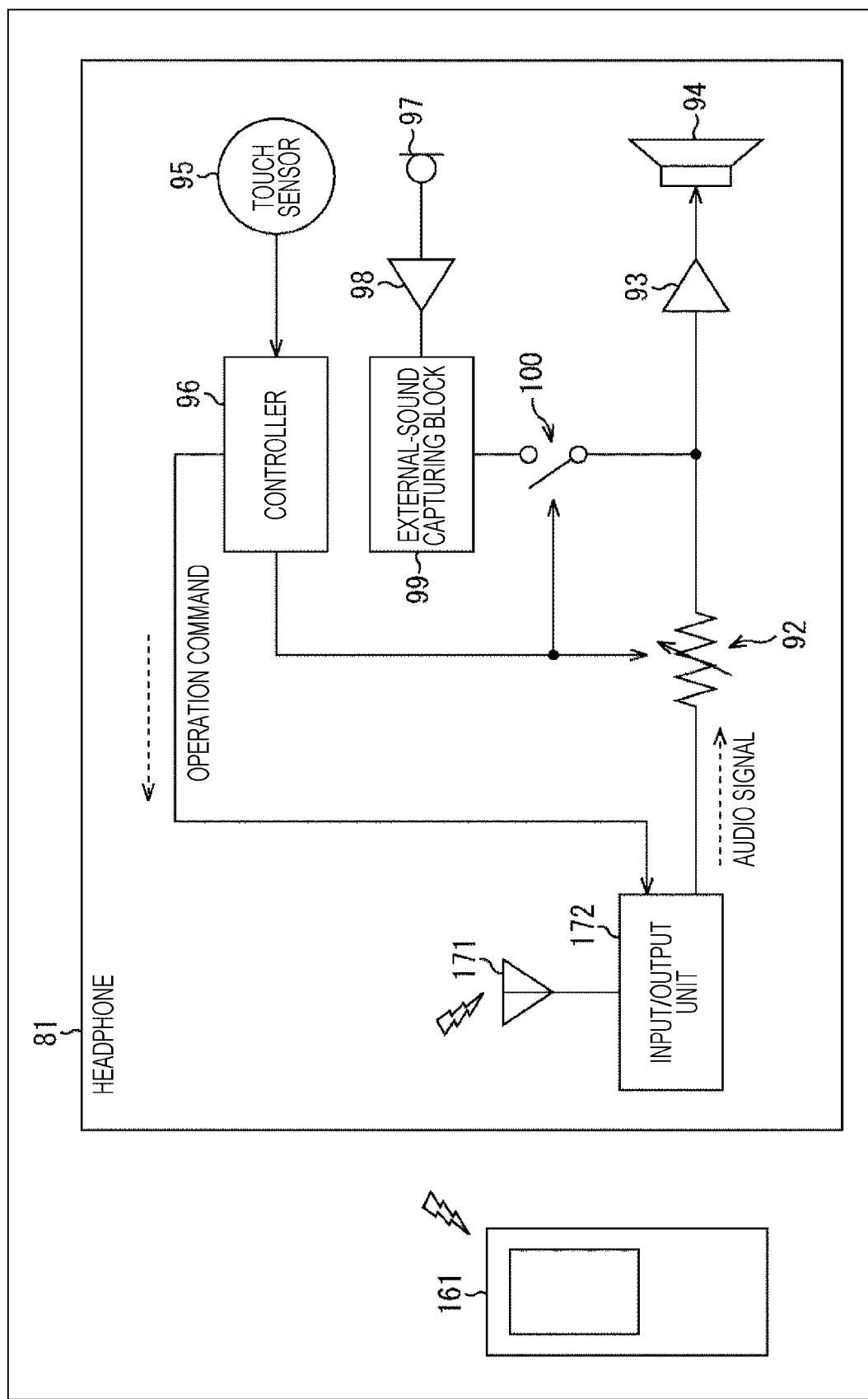
FIG. 8 is a diagram of an exemplary functional configuration of a headphone.

In the example illustrated in FIG. 8, the headphone 81 and an audio reproducing device 161 wirelessly communicate with each other in accordance with a standard, such as Bluetooth (registered trademark) to give and receive audio of content to be reproduced, namely, an audio signal or an operation command for reproduction control.

Typically, Bluetooth (registered trademark) is often used for the exchange between a headphone and an audio reproducing device, but here the following description will be given with the headphone 81 and the audio reproducing device 161 that wirelessly communicate with each other in an arbitrary scheme.

In addition, the headphone 81 illustrated in FIG. 8 includes an antenna 171, an input/output unit 172, an attenuator 92, an amplifier 93, a speaker 94, a touch sensor 95, a controller 96, a microphone 97, an amplifier 98, an external-sound capturing block 99, and a switch 100.

That is, the configuration of the headphone 81 of FIG. 8 is different from the configuration of the headphone 81 illustrated in FIG. 4 in that the antenna 171 and the input/output unit 172 are provided instead of the input unit 91. Except the point, the configuration of the headphone 81 of FIG. 8 is similar to the configuration of the headphone 81 illustrated in FIG. 4.

In the headphone 81 illustrated in FIG. 8, the antenna 171 receives the audio signal of the audio of the content under reproduction, transmitted from the audio reproducing device 161 through the wireless communication, to supply the audio signal to the input/output unit 172. That is, the input/output unit 172 receives the audio signal with the antenna 171. The input/output unit 172 supplies the audio signal received to the speaker 94 through the attenuator 92 and the amplifier 93.

In addition, a detection unit 131 of the controller 96 detects a motion (operation) of a user to the touch sensor 95, on the basis of a detected signal from the touch sensor 95.

In the example, in addition to a motion in which the touch sensor 95 gets covered, a different motion from the motion, such as a tap motion or a swipe motion, is detected by the detection unit 131.

For example, the user makes the tap motion or the swipe motion when indicating the control relating to the reproduction of the audio of the content, such as causing the reproduction of the audio of the content to stop, causing the reproduction of the audio of the content to pause, or causing the content to fast-forward.

In this manner, in a case where the user makes the different motion from the motion in which the touch sensor 95 gets covered, to the touch sensor 95, the controller 96 performs processing of a different function from an external-sound capturing function.

That is, in response to the detected result of the motion (operation) of the user by the detection unit 131, the controller 96 generates the operation command being a command relating to the reproduction of the audio of the content, to supply the operation command to the input/output unit 172. For example, the operation command indicates the stop of the reproduction or the pause of the reproduction and the like.

The input/output unit 172 transmits the operation command supplied from the controller 96, to the audio reproducing device 161 through the wireless communication with the antenna 171.

Then, the audio reproducing device 161 receives the operation command transmitted from the headphone 81, to perform processing corresponding to the operation command. For example, in a case where receiving the operation command indicating the stop of the reproduction, the audio reproducing device 161 stops transmitting the audio signal of the audio of the content transmitted to the headphone 81 until now, to cause the reproduction of the audio of the content to stop.

<Description of External-Sound Capturing Processing>

Figure 9:
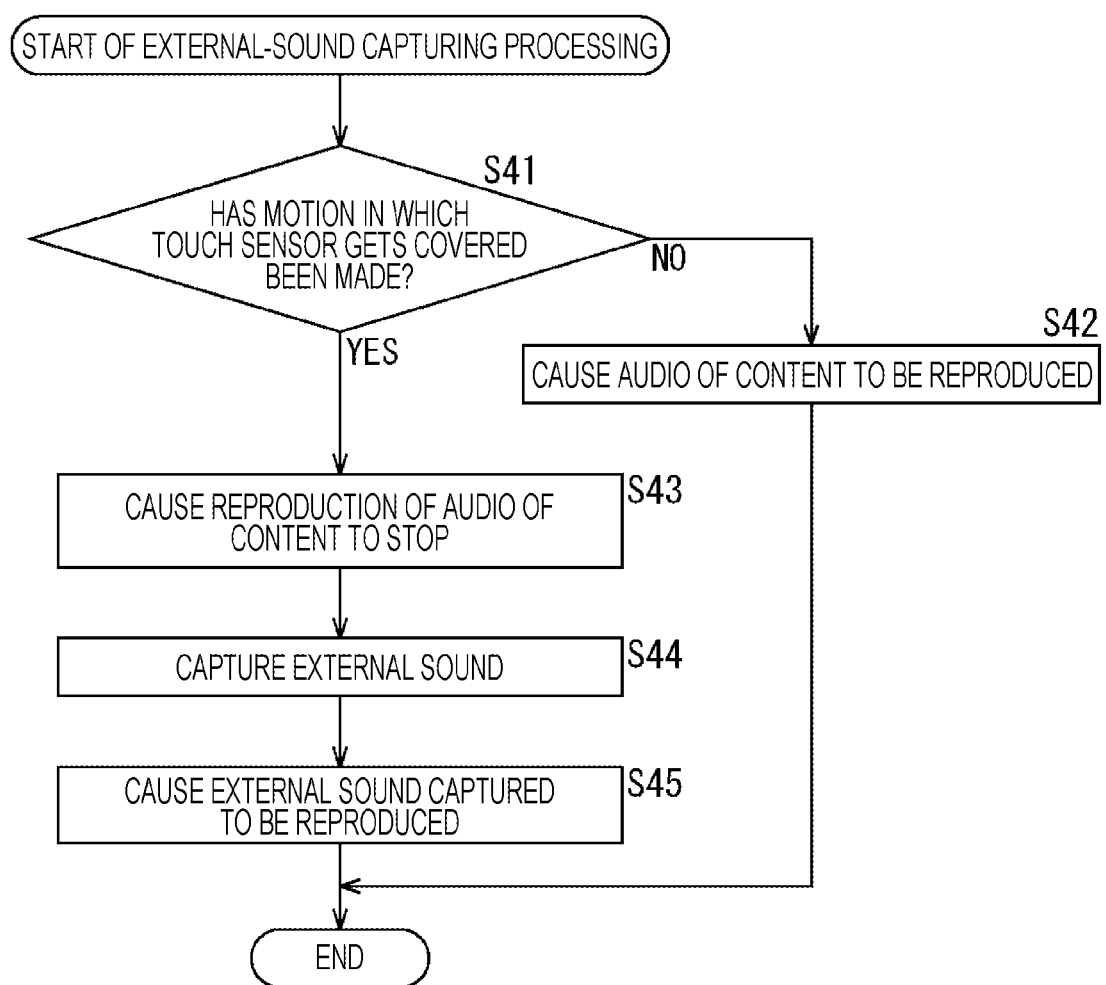
FIG. 9 is a flowchart for describing external-sound capturing processing.

Next, external-sound capturing processing to be performed by the headphone 81 illustrated in FIG. 8 will be described with reference to a flowchart of FIG. 9.

Note that, here the audio reproducing device 161 has been continuously transmitting the audio signal of the audio of the content to the headphone 81, and thus the audio of the content is being reproduced.

Figure 7:
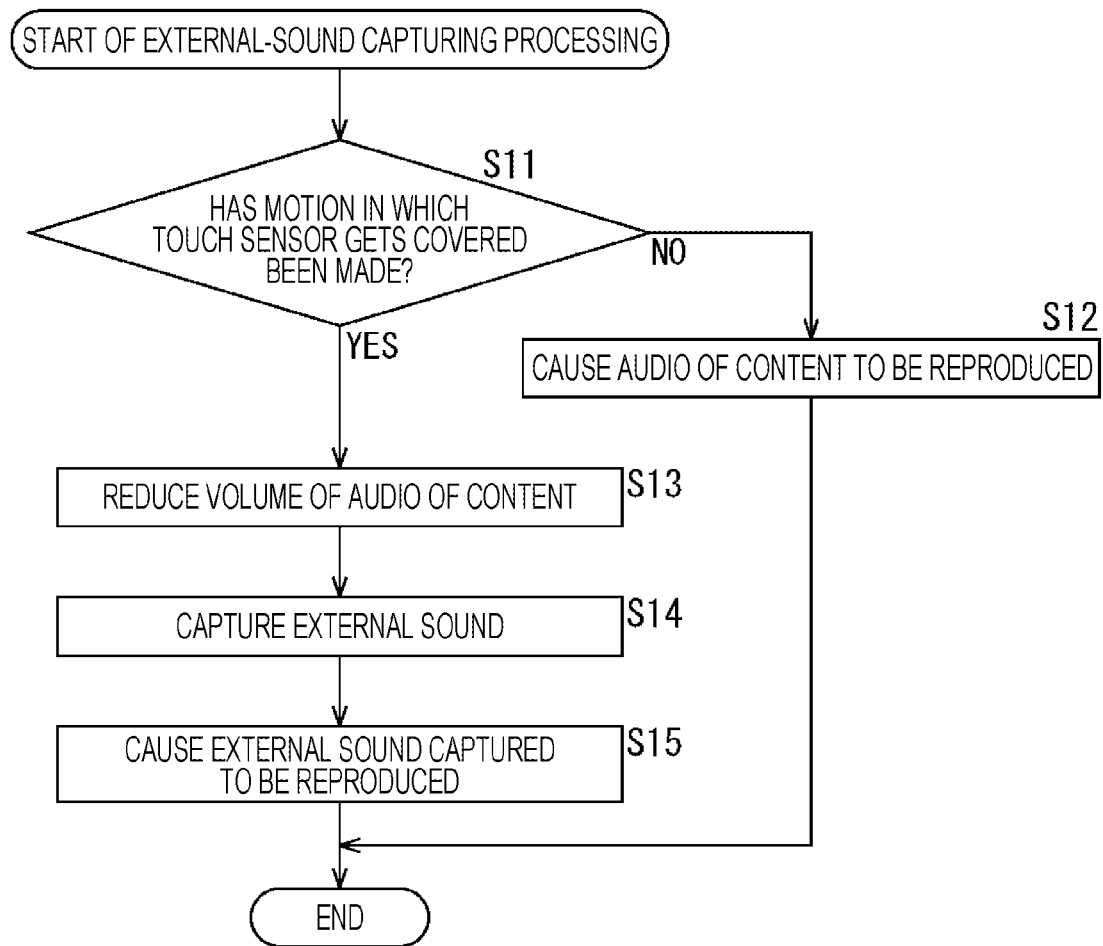
FIG. 7 is a flowchart for describing external-sound capturing processing.

When the external-sound capturing processing starts, the processing at steps S41 and S42 is performed, but the processing is similar to the processing at steps S11 and S12 of FIG. 7, and thus the description thereof will be omitted.

Note that, in this case, at step S42, the input/output unit 172 receives the audio signal transmitted from the audio reproducing device 161 with the antenna 171, and additionally supplies the audio signal received to the speaker 94 through the attenuator 92 and the amplifier 93. Then, the speaker 94 reproduces the audio of the content on the basis of the audio signal supplied from the input/output unit 172.

In contrast to this, in a case where it is determined at step S41 that the motion in which the touch sensor 95 gets covered has been made, the controller 96 causes the reproduction of the audio of the content to stop, at step S43.

Specifically, the controller 96 generates the operation command indicating the stop of the reproduction, to supply the operation command to the input/output unit 172. The input/output unit 172 transmits the operation command supplied from the controller 96, to the audio reproducing device 161 through the wireless communication with the antenna 171.

Then, the audio reproducing device 161 that has received the operation command transmitted, stops transmitting the audio signal of the audio of the content reproduced until now, in response to the operation command. This arrangement causes the audio signal not to be transmitted from the audio reproducing device 161 to the headphone 81, and thus the reproduction of the audio of the content stops in the headphone 81.

Note that, at step S43, the controller 96 may cause the reproduction of the audio of the content to pause instead of causing the reproduction of the audio of the content to stop completely. In addition, similarly to step S13 of FIG. 7, the controller 96 may cause the attenuator 92 to reduce or mute the volume of the audio of the content under reproduction.

In the present specification, the case where the reproduction stops completely and the case where the reproduction pauses have been distinctively described basically, but when only an expression of the stop of the reproduction is given with no particular distinction, the case where the reproduction pauses is included in addition to the case where the reproduction stops completely.

After the reproduction of the audio of the content stops, the processing at steps S44 and S45 is performed and then the external-sound capturing processing finishes. The processing is similar to the processing at steps S14 and S15 of FIG. 7, and thus the description thereof will be omitted.

As described above, the headphone 81 detects the motion in which the user covers the touch sensor 95. In response to the detected result thereof, the headphone 81 causes the reproduction of the audio of the content to stop and additionally reproduces the external sound. This arrangement enables the user to catch the external sound more easily and promptly.

Third Embodiment

<Exemplary Functional Configuration of Headphone>

In addition, the headphone 81 illustrated in FIG. 8 may be further provided with a noise-cancelling function. In that case, the headphone 81 has, for example, a configuration illustrated in FIG. 10. Note that, parts in FIG. 10 corresponding to those in FIG. 8 are denoted with the same reference signs, and thus the descriptions thereof will be appropriately omitted.

Figure 10:
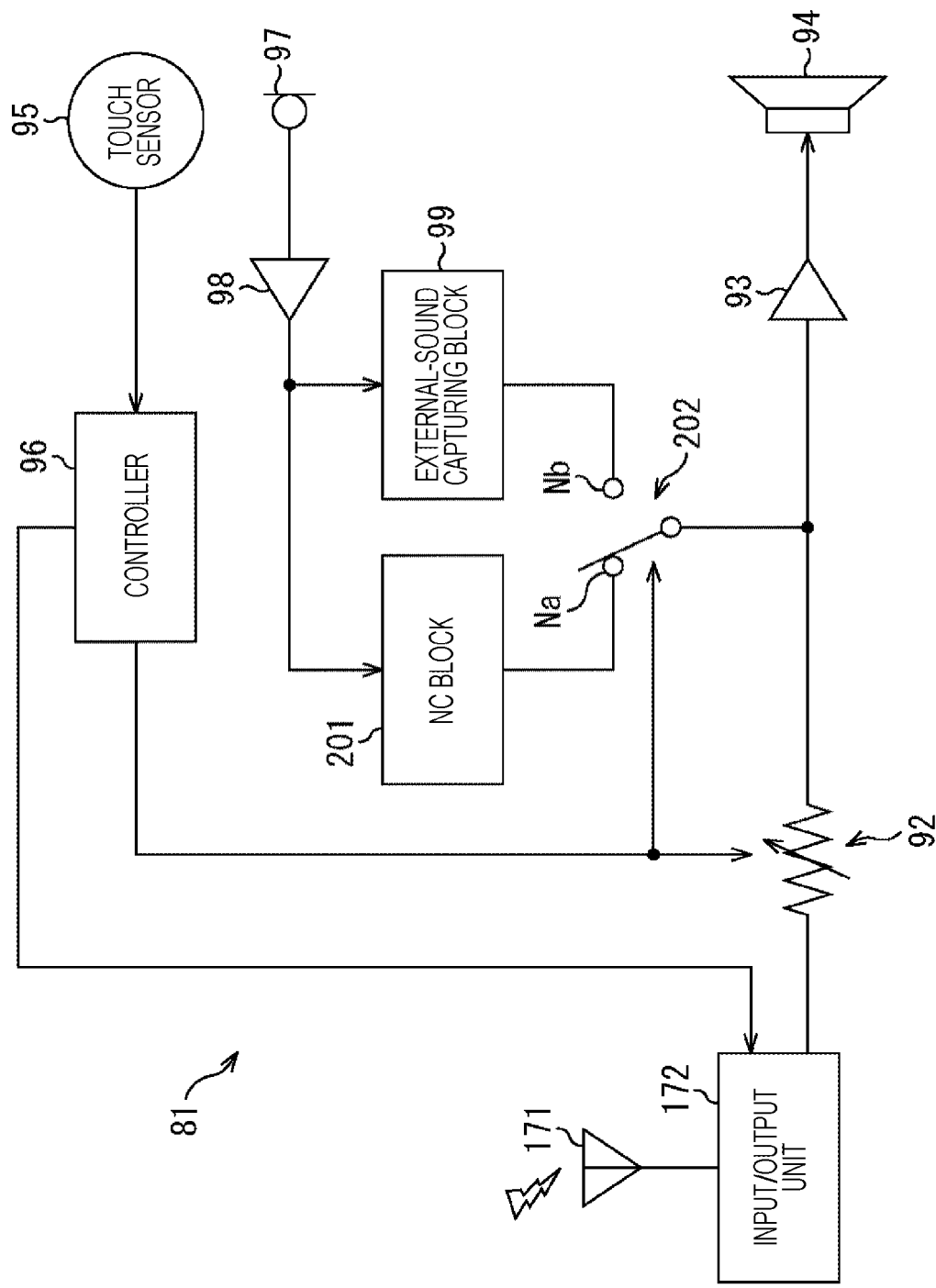
FIG. 10 is a diagram of an exemplary functional configuration of a headphone.

The headphone 81 illustrated in FIG. 10 includes an antenna 171, an input/output unit 172, an attenuator 92, an amplifier 93, a speaker 94, a touch sensor 95, a controller 96, a microphone 97, an amplifier 98, an external-sound capturing block 99, a noise cancelling (NC) block 201, and a switch 202.

That is, the configuration of the headphone 81 of FIG. 10 is different from the configuration of the headphone 81 illustrated in FIG. 8 in that no switch 100 is provided but the NC block 201 and the switch 202 are newly provided. Except the point, the configuration of the headphone 81 of FIG. 10 is similar to the configuration of the headphone 81 of FIG. 8.

In the example, the amplifier 98 is connected with not only the external-sound capturing block 99 but also the NC block 201. In addition, a node Na is connected with an output of the NC block 201, and a node Nb is connected with an output of the external-sound capturing block 99.

The NC block 201 generates and outputs a noise-cancelling signal for noise cancelling, on the basis of an external-sound signal supplied from the microphone 97 through the amplifier 98.

Therefore, reproduction with supply of the noise-cancelling signal to the speaker 94 can cancel external sound that a user hears leaking from the outside of the headphone 81, so that the noise-cancelling function can be achieved.

The NC block 201 functions as a noise-cancelling processing unit that achieves the noise-cancelling function on the basis of the external-sound signal. In addition, the headphone 81 has the microphone 97 used in common between external-sound capturing and noise cancelling.

Note that separate microphones may be used for the external-sound capturing and the noise cancelling.

The switch 202 switches to either the node Na or the node Nb for a destination, in accordance with the control of the controller 96. That is, the switch 202 switches for a source of a signal to be output to the amplifier 93.

Specifically, when the switch 202 is connected with the node Na, the noise-cancelling signal output from the NC block 201 is supplied to the amplifier 93 through the switch 202. In addition, when the switch 202 is connected with the node Nb, the external-sound signal output from the external-sound capturing block 99 is supplied to the amplifier 93 through the switch 202.

<Description of External-Sound Capturing Processing>

Next, external-sound capturing processing to be performed by the headphone 81 illustrated in FIG. 10 will be described with reference to a flowchart of FIG. 11.

Note that, here an audio reproducing device 161 has been continuously transmitting an audio signal of audio of content to the headphone 81, and thus the audio of the content is being reproduced.

At step S71, a detection unit 131 of the controller 96 determines whether the user has acted to cover the touch sensor 95, on the basis of a detected signal supplied from the touch sensor 95. Note that, the determination of whether the motion in which the touch sensor 95 gets covered has been made, is made at step S71 in a similar manner to step S11 of FIG. 7.

In a case where it is determined at step S71 that the motion in which the touch sensor 95 gets covered has not been made, the NC block 201 generates the noise-cancelling signal at step S72.

That is, the headphone 81 has the microphone 97 constantly collecting the external sound. The NC block 201 acquires the external-sound signal from the microphone 97 through the amplifier 98, to generate the noise-cancelling signal.

At this time, the NC block 201 may perform processing such as frequency characteristic correction, to the noise-cancelling signal as necessary. The NC block 201 outputs the noise-cancelling signal acquired in this manner, to the node Na.

At step S73, the controller 96 controls the switch 202 to combine the noise-cancelling signal with the audio signal and causes the audio of the content to be reproduced, and then the external-sound capturing processing finishes.

Specifically, the switch 202 selects the node Na as the destination in response to the control of the controller 96. This arrangement allows the noise-cancelling signal output from the NC block 201 to be supplied to the amplifier 93 through the switch 202. In addition, the input/output unit 172 supplies the audio signal of the audio of the content under reproduction, to the amplifier 93 through the attenuator 92.

Therefore, the amplifier 93 is supplied with a signal acquired by the combination of the audio signal and the noise-cancelling signal (hereinafter, also referred to as a combined audio signal). The amplifier 93 amplifies and supplies the combined audio signal supplied, to the speaker 94.

In addition, the speaker 94 reproduces the audio of the content, on the basis of the combined audio signal supplied from the amplifier 93. This arrangement allows the audio of the content and audio for the noise cancelling to be reproduced. That is, the reproduction of the audio of the content is performed with the noise-cancelling function remaining performed.

In this case, the audio for the noise cancelling and the external sound arriving at an ear of the user due to leakage from the outside, cancel each other out, and thus the user hears only the audio of the content.

Meanwhile, in a case where it is determined at step S71 that the motion in which the touch sensor 95 gets covered has been made, the processing at steps S74 to S76 is performed and then the external-sound capturing processing finishes. The processing is similar to the processing at steps S43 to S45 of FIG. 9, and thus the description thereof will be omitted.

Note that, at step S76, the controller 96 controls the switch 202 to select the node Nb as the destination. This arrangement allows the external-sound signal output from the external-sound capturing block 99 to be supplied to the speaker 94 through the switch 202 and the amplifier 93, so that the speaker 94 reproduces the external sound.

As described above, the headphone 81 detects the motion in which the user covers the touch sensor 95. In response to the detected result thereof, the headphone 81 causes the reproduction of the audio of the content to stop and additionally reproduces the external sound. This arrangement enables the user to catch the external sound more easily and promptly. Particularly, the performance of the noise-cancelling during the reproduction of the audio of the content, can provide an environment suitable to content appreciation.

Fourth Embodiment

<Exemplary Functional Configuration of Headphone>

In addition, the headphone 81 illustrated in FIG. 10 provides either the external-sound signal or the noise-cancelling signal to the speaker 94 with the switch 202, but a mixer may be used instead of the switch 202.

Figure 12:
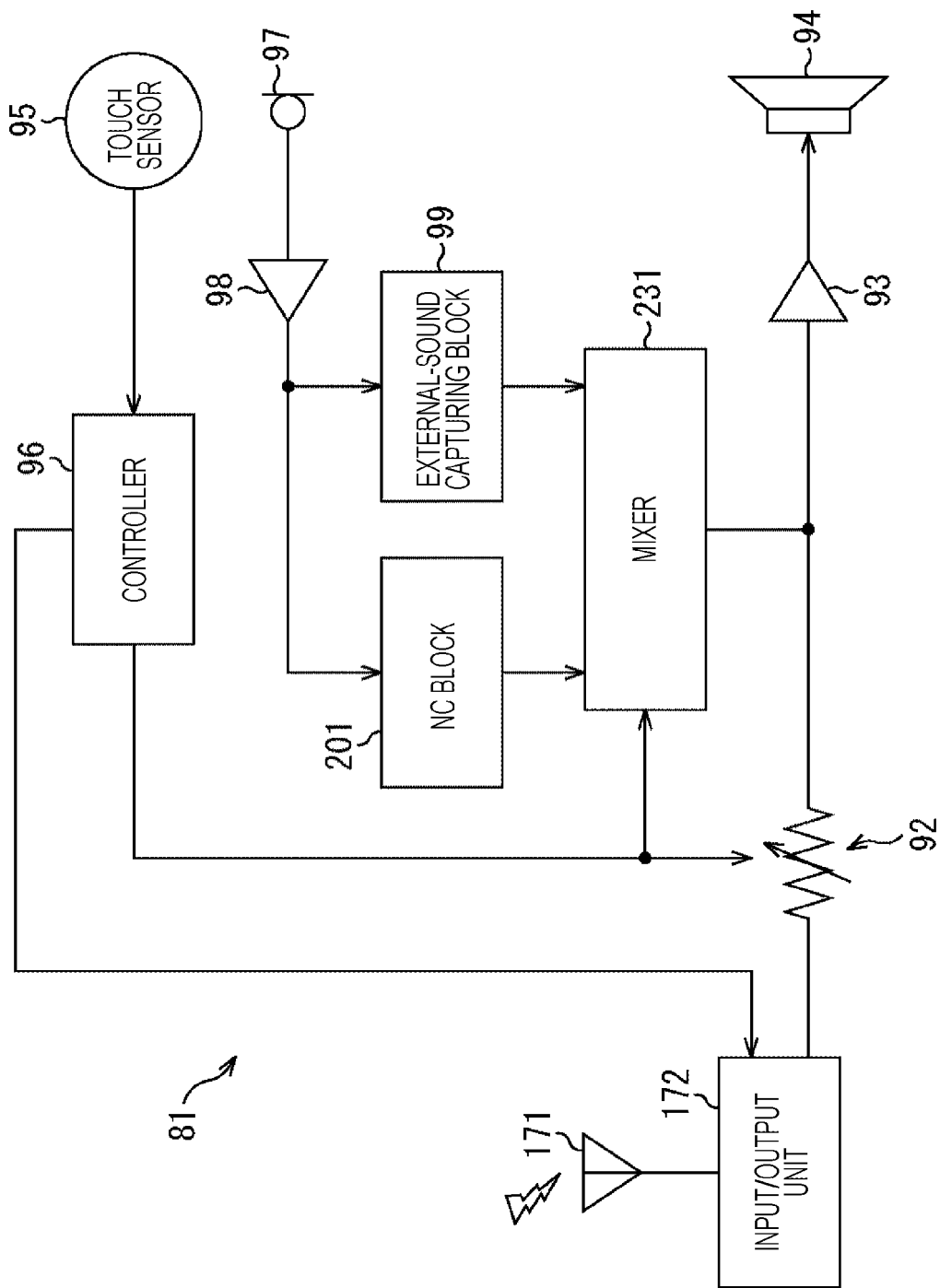
FIG. 12 is a diagram of an exemplary functional configuration of a headphone.

In that case, the headphone 81 has, for example, a configuration illustrated in FIG. 12. Note that, parts in FIG. 12 corresponding to those in FIG. 10 are denoted with the same reference signs, and thus the descriptions thereof will be appropriately omitted.

The headphone 81 illustrated in FIG. 12 includes an antenna 171, an input/output unit 172, an attenuator 92, an amplifier 93, a speaker 94, a touch sensor 95, a controller 96, a microphone 97, an amplifier 98, an external-sound capturing block 99, a NC block 201, and a mixer 231.

That is, the configuration of the headphone 81 of FIG. 12 is different from the configuration of the headphone 81 illustrated in FIG. 10 in that the mixer 231 is provided instead of the switch 202. Except the point, the configuration of the headphone 81 of FIG. 12 is similar to the configuration of the headphone 81 of FIG. 10.

In the example, in accordance with the control of the controller 96, the mixer 231 appropriately mixes a cancelling signal supplied from the NC block 201 and an external-sound signal supplied from the external-sound capturing block 99 at a predetermined ratio, and outputs a mixed signal acquired as a result to the amplifier 93.

For example, when the noise-cancelling signal and the external-sound signal are indicated with Nc and Ot, respectively, and arbitrary coefficients are defined as a and $\beta$, the mixed signal Mx satisfies the following expression: Mx=$\alpha$Nc+$\beta$Ot. Note that the sum of the coefficient $\alpha$ and the coefficient $\beta$ is not necessarily required to be 1.

For example, as the coefficient $\alpha$ increases, the contribution ratio of the noise-cancelling signal to the mixed signal increases. Conversely, as the coefficient $\beta$ increases, the contribution ratio of the external-sound signal to the mixed signal increases. Particularly, when the coefficient $\beta$ satisfies the following expression: $\beta$=0, the mixed signal is substantially the noise-cancelling signal.

Thus, for example, during typical reproduction of audio of content, namely, when the audio of the content is reproduced with a noise-cancelling function remaining performed, the mixer 231 makes the coefficient $\beta$ satisfy the following expression: $\beta$=0, and supplies the noise-cancelling signal to the amplifier 93.

In contrast to this, when an external-sound capturing function is performed, the mixer 231 generates the mixed signal having the coefficients $\alpha$ and $\beta$ each being an appropriate value not zero, and supplies the mixed signal to the amplifier 93.

At this time, the external-sound signal and the noise-cancelling signal subjected to, for example, frequency characteristic correction by filter processing are used for the generation of the mixed signal, for example.

Specifically, for example, the external-sound capturing block 99 performs the frequency characteristic correction to the external-sound signal so that a middle to high pitched sound is extracted, namely, the frequency band of human voice is emphasized.

In addition, the NC block 201 performs the frequency characteristic correction to the noise-cancelling signal so that only a low pitched sound, namely, a low-frequency component being the component of a frequency band not being the frequency of human voice, is cancelled. That is, the frequency characteristic correction is performed so that audio cancelling only the low-frequency component is acquired as audio based on the noise-cancelling signal.

In this case, if combined audio is reproduced on the basis of the mixed signal acquired by the combination (mixture) of the external-sound signal and the noise-cancelling signal, sound excluding human voice is cancelled and only the human voice is heard clearly. That is, if the combined audio acquired by the combination (mixture) of the audio for noise cancelling and the external sound, is reproduced, the human voice a user desires to listen to as the external sound is heard clearly.

Note that, during the performance of the external-sound capturing function, for example, making the coefficient $\beta$ multiplied by the external-sound signal satisfy the following expression: $\beta$>1, namely, making the coefficient $\beta$ larger than 1 and amplifying the external-sound signal enable the external sound to be caught more easily. In this case, the user can catch the external sound more loudly and clearly than listens to the external sound with the headphone 81 taken off.

<Description of External-Sound Capturing Processing>

Next, external-sound capturing processing to be performed by the headphone 81 illustrated in FIG. 12 will be described with reference to a flowchart of FIG. 13.

Note that, here an audio reproducing device 161 has been continuously transmitting an audio signal of the audio of the content to the headphone 81, and thus the audio of the content is being reproduced.

Figure 11:
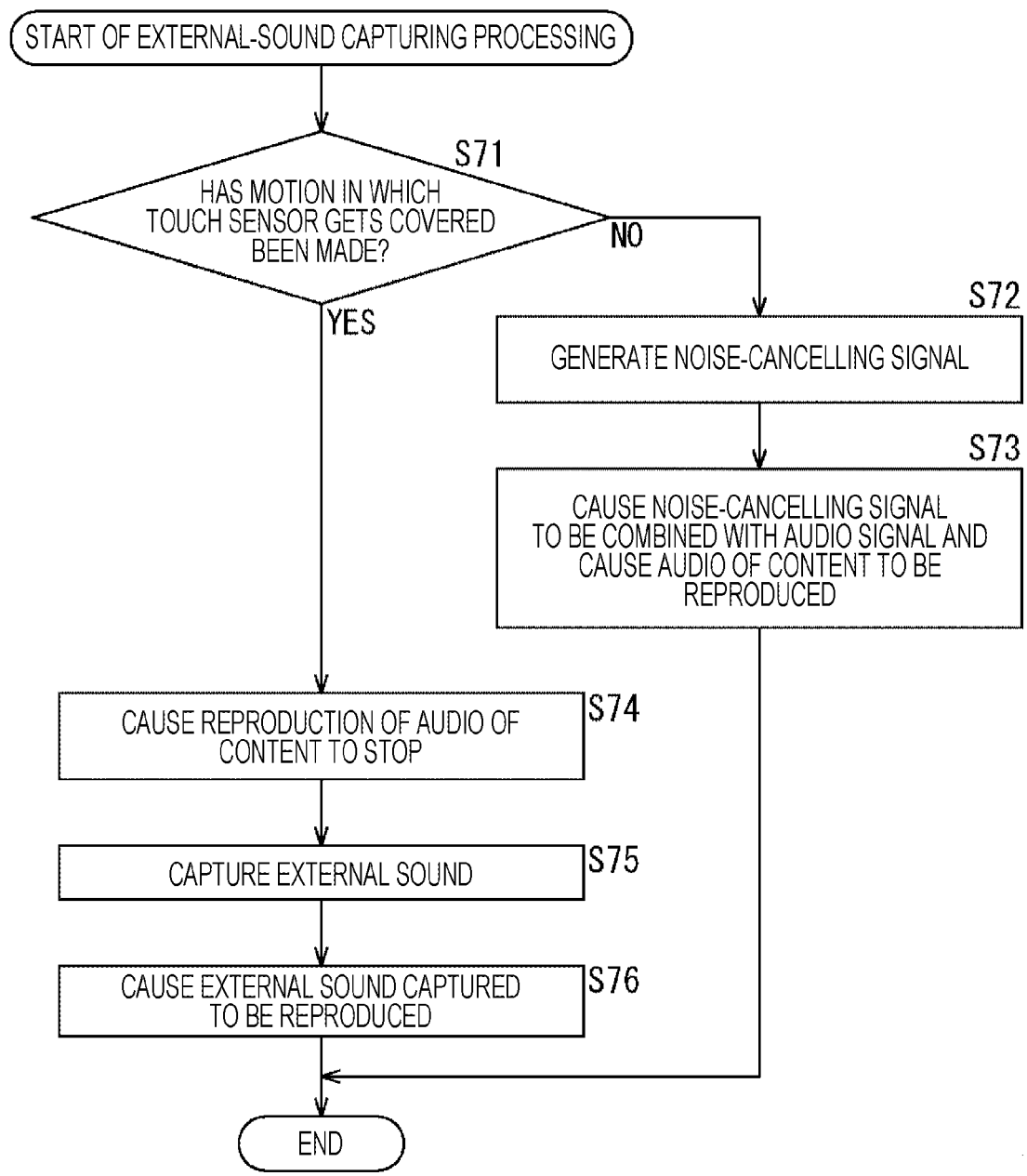
FIG. 11 is a flowchart for describing external-sound capturing processing.

In addition, when the external-sound capturing processing starts, the processing at steps S101 to S103 is performed, but the processing is similar to the processing at steps S71 to S73 of FIG. 11, and thus the description thereof will be appropriately omitted.

Note that, at step S103, in accordance with the control of the controller 96, the mixer 231 generates the mixed signal substantially being the noise-cancelling signal, with the coefficients $\alpha$ and $\beta$ satisfying the following expressions: $\alpha$=1 and $\beta$=0, respectively, and supplies the mixed signal to the speaker 94 through the amplifier 93.

In addition, in a case where it is determined at step S101 that a motion in which the touch sensor 95 gets covered has been made, the controller 96 causes the reproduction of the audio of the content to stop at step S104. Note that the processing similar to that at step S43 of FIG. 9 is performed at step S104. That is, an operation command indicating the stop of the reproduction is generated and transmitted to the audio reproducing device 161. In this case, the reproduction may pause or the attenuator 92 may reduce or mute the volume of the audio of the content.

At step S105, the external-sound capturing block 99 captures the external sound around the headphone 81. That is, at step S105, the processing similar to that at step S44 of FIG. 9 is performed to generate the external-sound signal.

At this time, the external-sound capturing block 99 performs, for example, the frequency characteristic correction to the external-sound signal with the filtering processing so that the middle to high pitched sound is extracted, and supplies the external-sound signal subjected to the frequency characteristic correction, to the mixer 231.

At step S106, the NC block 201 generates and supplies the noise-cancelling signal to the mixer 231.

That is, the NC block 201 acquires the external-sound signal from the microphone 97 through the amplifier 98 and generates the noise-cancelling signal. Furthermore, the NC block 201 performs, for example, the frequency characteristic correction to the noise-cancelling signal acquired, with the filtering processing so that only the low pitched sound is cancelled, and supplies the noise-cancelling signal subjected to the frequency characteristic correction, to the mixer 231.

At step S107, the mixer 231 combines the external-sound signal supplied from the external-sound capturing block 99 and the noise-cancelling signal supplied from the NC block 201 to generate the mixed signal, in accordance with the control of the controller 96.

At step S108, the controller 96 causes the mixer 231 to reproduce the mixed signal, and the external-sound capturing processing finishes.

That is, the controller 96 causes the mixer 231 to supply the mixed signal acquired at step S107, to the speaker 94 through the amplifier 93. At this time, the mixed audio to be reproduced by the speaker 94 has been corrected so that the frequency band of the human voice in the external sound is caught more easily.

As described above, the headphone 81 detects the motion in which the user covers the touch sensor 95. In response to the detected result thereof, the headphone 81 causes the reproduction of the audio of the content to stop and additionally reproduces the external sound. This arrangement enables the user to catch the external sound more easily and promptly. Particularly, using the noise-cancelling signal during the reproduction of the external sound, enables the external sound to be caught more easily.

Fifth Embodiment

<Exemplary Functional Configuration of Headphone>

In addition, the headphone 81 illustrated in FIG. 12 may be further provided with a switch dedicated for external-sound capturing.

Figure 14:
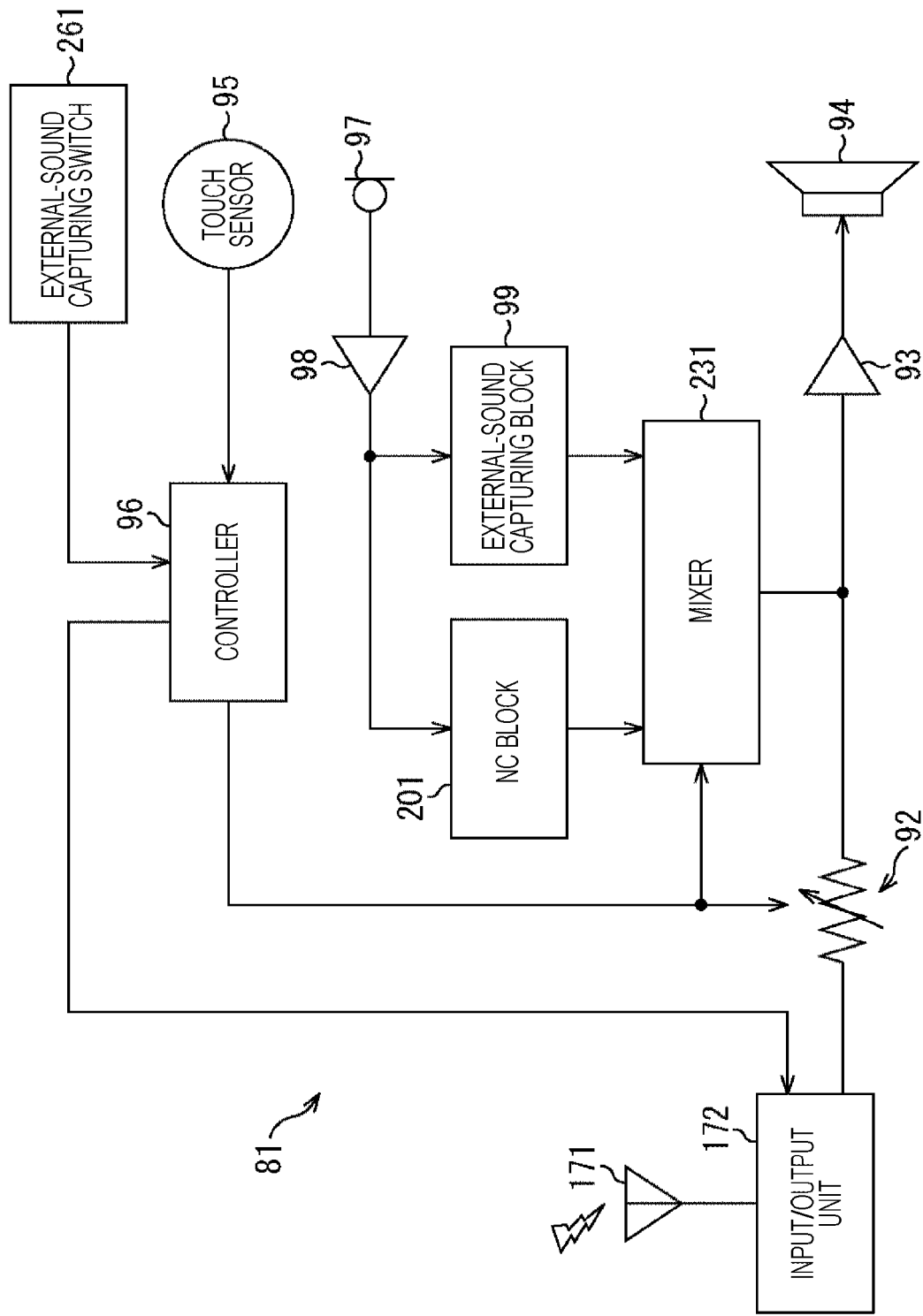
FIG. 14 is a diagram of an exemplary functional configuration of a headphone.

In that case, the headphone 81 has, for example, a configuration illustrated in FIG. 14. Note that, parts in FIG. 14 corresponding to those in FIG. 12 are denoted with the same reference signs, and thus the descriptions thereof will be appropriately omitted.

The headphone 81 illustrated in FIG. 14 includes an antenna 171, an input/output unit 172, an attenuator 92, an amplifier 93, a speaker 94, an external-sound capturing switch 261, a touch sensor 95, a controller 96, a microphone 97, an amplifier 98, an external-sound capturing block 99, a NC block 201, and a mixer 231.

That is, the configuration of the headphone 81 of FIG. 14 is different from the configuration of the headphone 81 illustrated in FIG. 12 in that the external-sound capturing switch 261 is newly provided. Except the point, the configuration of the headphone 81 of FIG. 14 is similar to the configuration of the headphone 81 of FIG. 12.

The external-sound capturing switch 261 is an operation unit for capture of external sound (outer sound), including, for example, a slide-type switch or a button-type switch. The external-sound capturing switch 261 is provided to, for example, a housing unit on the opposite side to a housing unit provided with the touch sensor 95 in the headphone 81.

The external-sound capturing switch 261 corresponds to, for example, the monitoring switch 23 illustrated in FIG. 1. A user operates the external-sound capturing switch 261 in capturing the external sound with audio of content under reproduction. The operation of the user causes the external-sound capturing switch 261 to supply a signal corresponding to the operation, to the controller 96.

<Description of External-Sound Capturing Processing>

Figure 15:
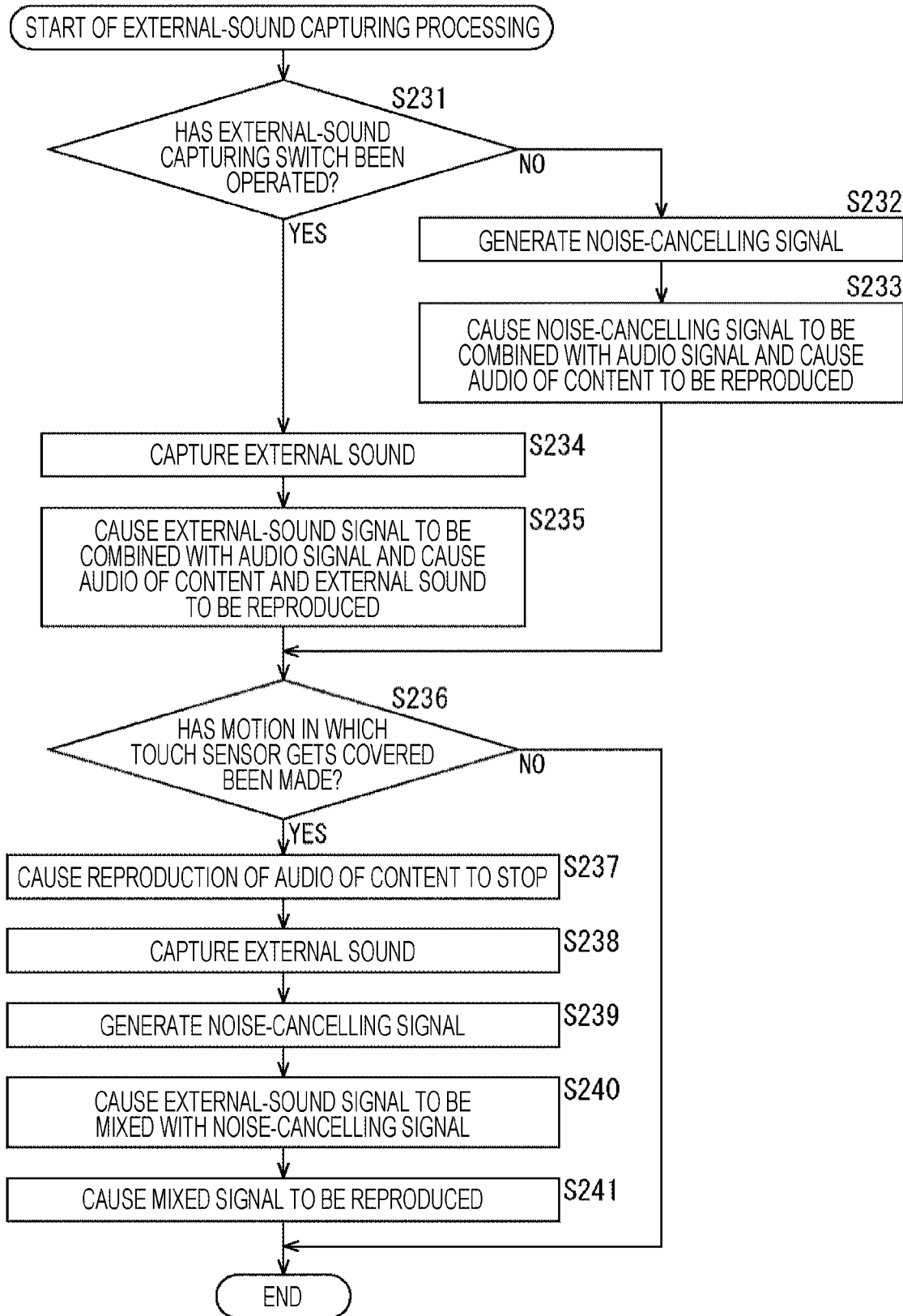
FIG. 15 is a flowchart for describing external-sound capturing processing.

Next, external-sound capturing processing to be performed by the headphone 81 illustrated in FIG. 14 will be described with reference to a flowchart of FIG. 15.

Note that, here an audio reproducing device 161 has been continuously transmitting an audio signal of the audio of the content to the headphone 81, and thus the audio of the content is being reproduced.

At step S231, the controller 96 determines whether the user has operated the external-sound capturing switch 261, on the basis of the signal supplied from the external-sound capturing switch 261. For example, in a case where the external-sound capturing switch 261 supplies the signal of the effect that the external-sound capturing switch 261 has been depressed, it is determined that the external-sound capturing switch 261 has been operated.

At steps S and S231, in a case where it is determined that the external-sound capturing switch 261 has not been operated, the processing at steps S232 and S233 is performed, and then the processing proceeds to step S236.

Figure 13:
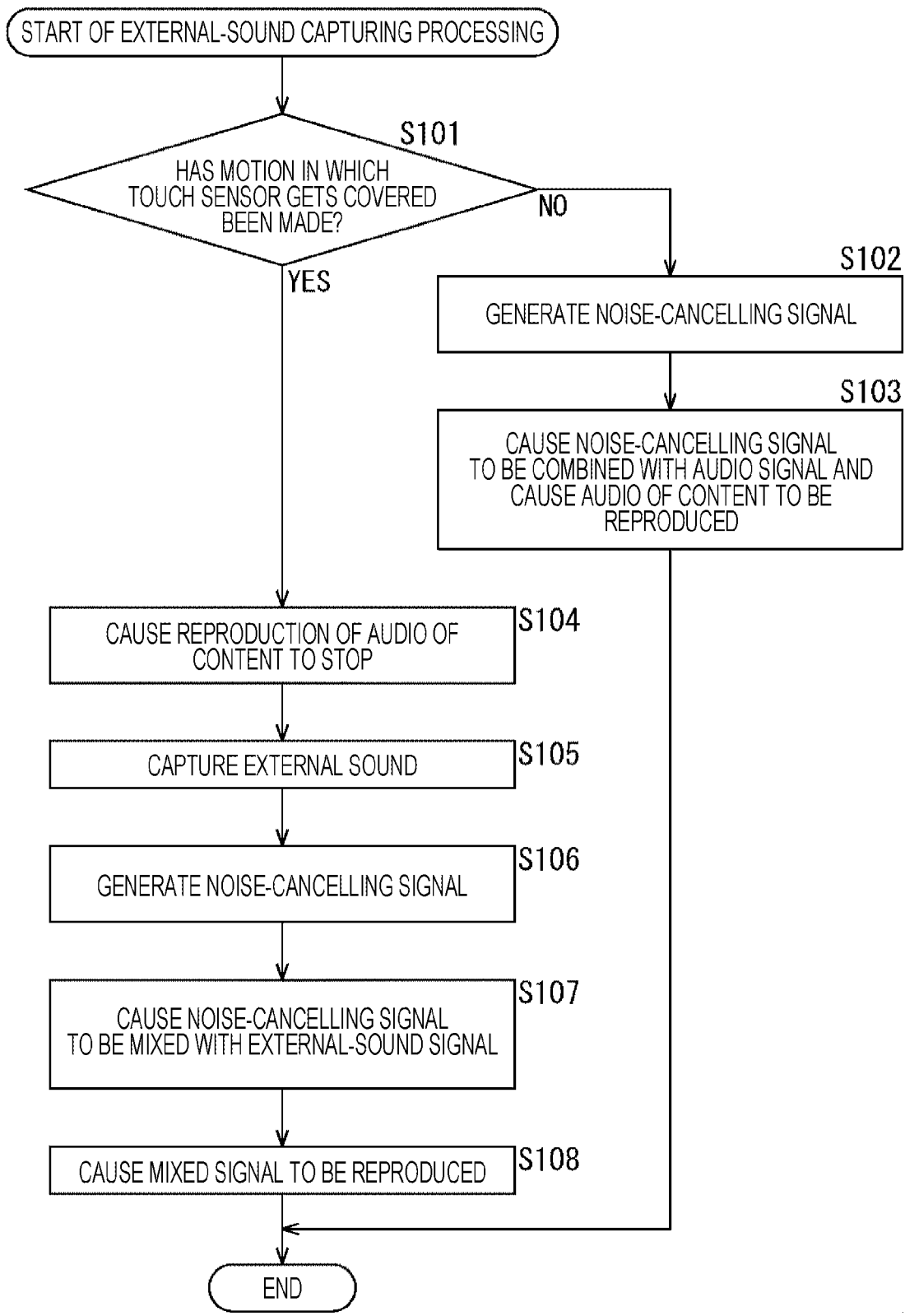
FIG. 13 is a flowchart for describing external-sound capturing processing.

Note that, the processing at steps S232 and S233 is similar to the processing at steps S102 and S103 of FIG. 13, and thus the description thereof will be omitted. In this case, the reproduction of the audio of the content is performed with a noise-cancelling function remaining performed.

In contrast to this, in a case where it is determined at step S231 that the external-sound capturing switch 261 has been operated, the external-sound capturing block 99 captures the external sound around the headphone 81, at step S234.

That is, after acquiring an external-sound signal from the microphone 97 through the amplifier 98, the external-sound capturing block 99 performs processing such as frequency characteristic correction, to the external-sound signal as necessary, and additionally supplies the external-sound signal subjected to the processing as necessary, to the mixer 231.

At step S235, the controller 96 causes the mixer 231 to combine the external-sound signal with the audio signal, and causes the audio of the content and the external sound to be reproduced.

That is, the audio of the content is being reproduced with supply of the audio signal from the input/output unit 172 to the speaker 94 through the attenuator 92 and the amplifier 93. In the state, the controller 96 causes the mixer 231 to supply the external-sound signal from the mixer 231 to the speaker 94 through the amplifier 93.

Then, the speaker 94 is supplied with a signal acquired by the combination of the audio signal and the external-sound signal. When the speaker 94 reproduces audio on the basis of the signal, the external sound is reproduced with the audio of the content under reproduction. Therefore, in this case, an external-sound capturing function is achieved with the audio of the content under reproduction.

When the processing is performed at step S235 or S233, at step S236, a detection unit 131 of the controller 96 determines whether the user has acted to cover the touch sensor 95, on the basis of a detected signal supplied from the touch sensor 95. Note that, the determination of whether the motion in which the touch sensor 95 gets covered has been made, is made at step S236 in a similar manner to step S11 of FIG. 7.

In a case where it is determined at step S236 that the motion in which the touch sensor 95 gets covered has not been made, the processing at steps S237 to S241 is skipped and the external-sound capturing processing finishes.

At the point in time when the processing at S236 is performed, the external-sound capturing function remains performed with the audio of the content under reproduction or the audio of the content remains reproduced with the noise-cancelling function remaining performed.

At this time, particularly in a case where the user has not acted to cover the touch sensor 95, namely, in a case where the performance of the external-sound capturing function of reproducing only the external sound has not been indicated, the processing performed until now is continuously performed.

In contrast to this, in a case where it is determined at step S236 that the motion in which the touch sensor 95 gets covered has been made, the processing at steps S237 to S241 is performed and the external-sound capturing processing finishes. Note that the processing at steps S237 to S241 is similar to the processing at steps S104 to S108 of FIG. 13, and thus the description thereof will be omitted.

In this case, in response to the motion of the user in which a hand covers the entire touch sensor 95, the processing causes the reproduction of the audio of the content to stop and causes the external-sound capturing function of reproducing only the external sound to be performed.

Particularly even in a case where the external sound has been reproduced until now with the audio of the content under reproduction, for example, the external-sound capturing function can be performed immediately without the reproduction of the audio of the content when the user makes the motion to the touch sensor 95 because the external sound is difficult to catch sufficiently.

As described above, the headphone 81 detects the motion in which the user converse the touch sensor 95 or the operation to the external-sound capturing switch 261. In response to the detected result thereof, the headphone 81 reproduces the external sound with the reproduction of the audio of the content stopping or the audio of the content under reproduction.

This arrangement enables the user to catch the external sound more easily and promptly. Particularly, the achievement of two types of external-sound capturing functions for the case where the external-sound capturing switch 261 is operated and the case where the motion to the touch sensor 95 is made, enables the user to use the functions properly in response to a situation, so that the usability of the headphone 81 can improve.

Here, the pieces of processing in series described above can be performed by hardware or can be performed by software. In a case where the pieces of processing in series are performed by software, a program included in the software is installed onto a computer that controls, for example, the headphone 11 or the headphone 81 described above. Here, examples of the computer include a computer built in dedicated hardware, a general-purpose computer, and the like that can perform various functions with installation of various programs. In addition, the program to be executed by the computer is previously recorded in, for example, a recording unit not illustrated of the headphone 11, the headphone 81 described above, or the like.

Note that the program to be executed by the computer may be a program for performing processing on a time series basis in the order described in the present specification, or may be a program for performing processing in parallel or with necessary timing at which a call is made, for example.

In addition, embodiments of the present technology are not limited to the embodiments described above, and thus various alterations may be made without departing from the scope of the spirit of the present technology.

In addition, the effects described in the present specification are, but are not limited to, just exemplifications, and thus additional effects may be provided.

Furthermore, the present technology can have the following configurations.

(1)

A headphone including:

a sound collecting unit configured to collect outer sound;

a detection unit configured to detect a specific motion to a sensor unit for capture of the outer sound; and a reproduction control unit configured to cause, in a case where the specific motion is detected, the outer sound collected by the sound collecting unit to be reproduced and volume of audio under reproduction to be reduced or the reproduction of the audio to stop.

(2)

The headphone according to (1), in which the sensor unit includes a touch sensor.

(3)

The headphone according to (1) or (2), further including the sensor unit.

(4)

The headphone according to any one of (1) to (3), in which the specific motion is a motion in which the sensor unit gets covered.

(5)

The headphone according to any one of (1) to (4), in which the detection unit detects a different motion from the specific motion to the sensor unit, and the reproduction control unit causes, in a case where the detection unit detects the different motion from the specific motion, processing of a different function from a function of reproducing the outer sound, to be performed.

(6)

The headphone according to any one of (1) to (5), further including an operation unit for the capture of the outer sound, in which the reproduction control unit causes, in a case where an operation to the operation unit is made, the outer sound collected by the sound collecting unit to be reproduced with the audio reproduced.

(7)

The headphone according to (6), in which the operation unit is a switch.

(8)

The headphone according to any one of (1) to (7), in which the reproduction control unit causes, during the detection of the specific motion, the outer sound to be continuously reproduced and the volume of the audio under reproduction to be reduced or the reproduction of the audio to stop.

(9)

The headphone according to any one of (1) to (7), in which the reproduction control unit starts, in the case where the specific motion is detected, control of reproducing the outer sound and reducing the volume of the audio under reproduction or stopping the reproduction of the audio.

(10)

The headphone according to any one of (1) to (9), further including a noise-cancelling processing unit configured to achieve a noise-cancelling function on the basis of the outer sound collected by the sound collecting unit (11)

The headphone according to (10), in which the reproduction control unit causes, in the case where the specific motion is detected, the volume of the audio under reproduction to be reduced or the reproduction of the audio to stop, and mixed audio of audio for noise cancelling and the outer sound collected by the sound collecting unit to be reproduced, the audio for noise cancelling being generated by the noise-cancelling processing unit on the basis of the outer sound.

(12)

The headphone according to (11), in which the audio for noise cancelling is audio that cancels a low-frequency component in the outer sound.

(13)

A reproduction control method of a headphone including a sound collecting unit configured to collect outer sound, the method including the steps of:

detecting a specific motion to a sensor unit for capture of the outer sound; and causing, in a case where the specific motion is detected, the outer sound collected by the sound collecting unit to be reproduced and volume of audio under reproduction to be reduced or the reproduction of the audio to stop.

(14)

A program for causing a computer configured to control a headphone including a sound collecting unit configured to collect outer sound, to execute processing including the steps of:

detecting a specific motion to a sensor unit for capture of the outer sound; and causing, in a case where the specific motion is detected, the outer sound collected by the sound collecting unit to be reproduced and volume of audio under reproduction to be reduced or the reproduction of the audio to stop.

REFERENCE SINGS LIST

11 Headphone
21-R, 21-L, 21 Housing unit
22 Touch sensor
23 Monitoring switch
81 Headphone
94 Speaker
95 Touch sensor
96 Controller
97 Microphone
131 Detection unit
201 NC block
231 Mixer
261 External-sound capturing switch

What is claimed is:

1. A sound output device comprising:
    a housing worn on an ear of a user and including a first housing face on a first side of the housing;
    a sound collecting device configured to collect outer sound;
    a sensor arranged on the first housing face;
    a detection device configured to detect a specific motion to the sensor to cause the sound collecting device to capture the outer sound;
    a noise-cancelling processing device configured to perform a noise-cancelling function based on the outer sound collected by the sound collecting device; and
    a reproduction control device configured to cause:
        in a case where the specific motion is detected, the outer sound captured by the sound collecting device to be reproduced, and volume of audio under reproduction to be reduced or the audio under reproduction to be stopped,
    wherein the reproduction control device is configured to control reproduction of the outer sound while the noise-cancelling function is performed by the noise cancelling processing device,
    wherein the sensor includes a touch sensor with a plurality of element lines,
    wherein the detection device determines that a respective element line is activated when a signal received from the respective element line is greater than a first threshold value,
    wherein the detection device compares a number of activated element lines to a second threshold value, and
    wherein the detection device detects an instance of the specific motion when the number of activated element lines is greater than the second threshold value.

2. The sound output device according to claim 1, wherein the specific motion includes at least one motion of tapping the sensor a predetermined number of times, swiping the sensor, covering the sensor, or touching the sensor.

3. The sound output device according to claim 1, wherein the detection device detects a different motion from the specific motion to the sensor, and
    the reproduction control device causes, in a case where the detection device detects the different motion from the specific motion, processing of a different function from a function of reproducing the outer sound.

4. The sound output device according to claim 1, further comprising an operation device, wherein the reproduction control device causes, in a case where an operation to the operation device is made, the outer sound captured by the sound collecting device to be reproduced with the audio reproduced.

5. The sound output device according to claim 4, wherein the operation device is a switch.

6. The sound output device according to claim 1, wherein the reproduction control device starts, in the case where the specific motion is detected, control of reproducing the captured outer sound and reducing the volume of the audio under reproduction or stopping the audio under reproduction.

7. The sound output device according to claim 6, wherein the reproduction control device causes, in the case where the specific motion is detected, reproduction of mixed audio including audio for noise cancelling and the outer sound captured by the sound collecting device.

8. The sound output device according to claim 7, wherein the audio for noise cancelling is audio that cancels a low-frequency component in the outer sound.

9. The sound output device according to claim 1, wherein the plurality of element lines are arranged in two directions.

10. The sound output device according to claim 1, wherein the second threshold value is at least three.

11. The sound output device according to claim 10, wherein the second threshold value is at least eight.

12. The sound output device according to claim 9, wherein each element line includes a plurality of touch sensor elements arranged in one of the two directions, and wherein the respective element line generates the signal in response to the user being in proximity to at least one of the plurality of touch sensor elements in the respective element line.

13. The sound output device according to claim 1, wherein the detection device lowers the first threshold value after detecting the specific motion.

14. A method comprising:
collecting, by a sound output device, outer sound;
detecting, by a detection device, a specific motion to a sensor on the sound output device a predetermined number of times to capture the outer sound; and
simultaneously performing, in response to detecting the specific motion, i) noise cancellation based on the collected outer sound, and ii) reproduction of the captured outer sound while reducing volume of audio under reproduction or causing the audio under reproduction to stop,
wherein the sensor includes a touch sensor with a plurality of element lines,
wherein the detection device determines that a respective element line is activated when a signal received from the respective element line is greater than a first threshold value,
wherein the detection device compares a number of activated element lines to a second threshold value, and
wherein the detection device detects an instance of the specific motion when the number of activated element lines is greater than the second threshold value.

15. The method according to claim 14, wherein the plurality of element lines are arranged in two directions.

16. The method according to claim 14, wherein the second threshold value is at least three.

17. The method according to claim 14, wherein the detection device lowers the first threshold value after detecting the specific motion.

18. A device for a sound output device, comprising:
a processor; and
a memory including instructions that when executed by the processor, cause the processor to:
collect outer sound;
detect a specific motion of tapping a sensor on the sound output device a predetermined number of times to capture the outer sound;
simultaneously perform noise cancelling based on the collected outer sound, and reproduce audio; and
in a case where the specific motion is detected, reproduce the captured outer sound, and reduce volume of the audio under reproduction or cause the audio under reproduction to stop,
wherein the sensor includes a touch sensor with a plurality of element lines,
wherein the processor determines that a respective element line is activated when a signal received from the respective element line is greater than a first threshold value,
wherein the processor compares a number of activated element lines to a second threshold value, and
wherein the processor detects an instance of the specific motion when the number of activated element lines is greater than the second threshold value.

* * * * *